United States Patent
Prendergast et al.

(10) Patent No.: US 11,195,678 B1
(45) Date of Patent: Dec. 7, 2021

(54) MAGNETIC SWITCH ADAPTER FOR NIGHT VISION GOGGLES

(71) Applicant: NOROTOS, INC., Santa Ana, CA (US)

(72) Inventors: Jonathon R. Prendergast, Newport Beach, CA (US); Ronald R. Soto, Santa Ana, CA (US)

(73) Assignee: NOROTOS, INC., Santa Ana, CA (US)

( * ) Notice: Subject to any disclaimer, the term of this patent is extended or adjusted under 35 U.S.C. 154(b) by 0 days.

(21) Appl. No.: 17/173,002

(22) Filed: Feb. 10, 2021

Related U.S. Application Data

(60) Provisional application No. 63/061,793, filed on Aug. 5, 2020, provisional application No. 63/061,795, filed on Aug. 6, 2020.

(51) Int. Cl.
*H01H 9/00* (2006.01)
*H01H 36/00* (2006.01)
*G02B 23/12* (2006.01)
*G02B 27/01* (2006.01)
*G02B 23/18* (2006.01)
*F16M 11/20* (2006.01)

(52) U.S. Cl.
CPC .... *H01H 36/0013* (2013.01); *F16M 11/2021* (2013.01); *G02B 23/125* (2013.01); *G02B 23/18* (2013.01); *G02B 27/0176* (2013.01); *H01H 36/0006* (2013.01); *H01H 36/0033* (2013.01); *F16M 2200/02* (2013.01)

(58) Field of Classification Search
CPC ........... H01H 36/0013; H01H 36/0006; H01H 36/0033; F16M 11/2021; F16M 2200/02; G02B 23/125; G02B 23/18; G02B 27/0176
USPC ........................................................ 355/205
See application file for complete search history.

(56) References Cited

U.S. PATENT DOCUMENTS

| | | | |
|---|---|---|---|
| 7,504,918 B2 | 3/2009 | Prendergast et al. | |
| 7,735,159 B2 | 6/2010 | Prendergast | |
| 2018/0042330 A1* | 2/2018 | Wu | A42B 3/085 |

* cited by examiner

*Primary Examiner* — William Choi
(74) *Attorney, Agent, or Firm* — Lewis Roca Rothgerber Christie LLP

(57) ABSTRACT

A night vision goggle adapter including: a goggle mount assembly; a primary magnet generating a magnetic flux; a magnetic flux conducting unit having a first end and a second end; a first plurality of shunts; and a second plurality of shunts disposed about the goggle mount assembly; wherein the magnetic flux conducting unit may overlap the primary magnet and form a magnetic circuit for conducting the magnetic flux towards the second end of the magnetic flux conducting unit when none of the first plurality of shunts and none of the second plurality of shunts are overlapped by the magnetic flux conducting unit; and wherein the magnetic flux is shorted through one of the first plurality of shunts or the second plurality of shunts when the magnetic flux conducting unit is positioned to overlap one of the first plurality of shunts or one of the second plurality of shunts.

11 Claims, 45 Drawing Sheets

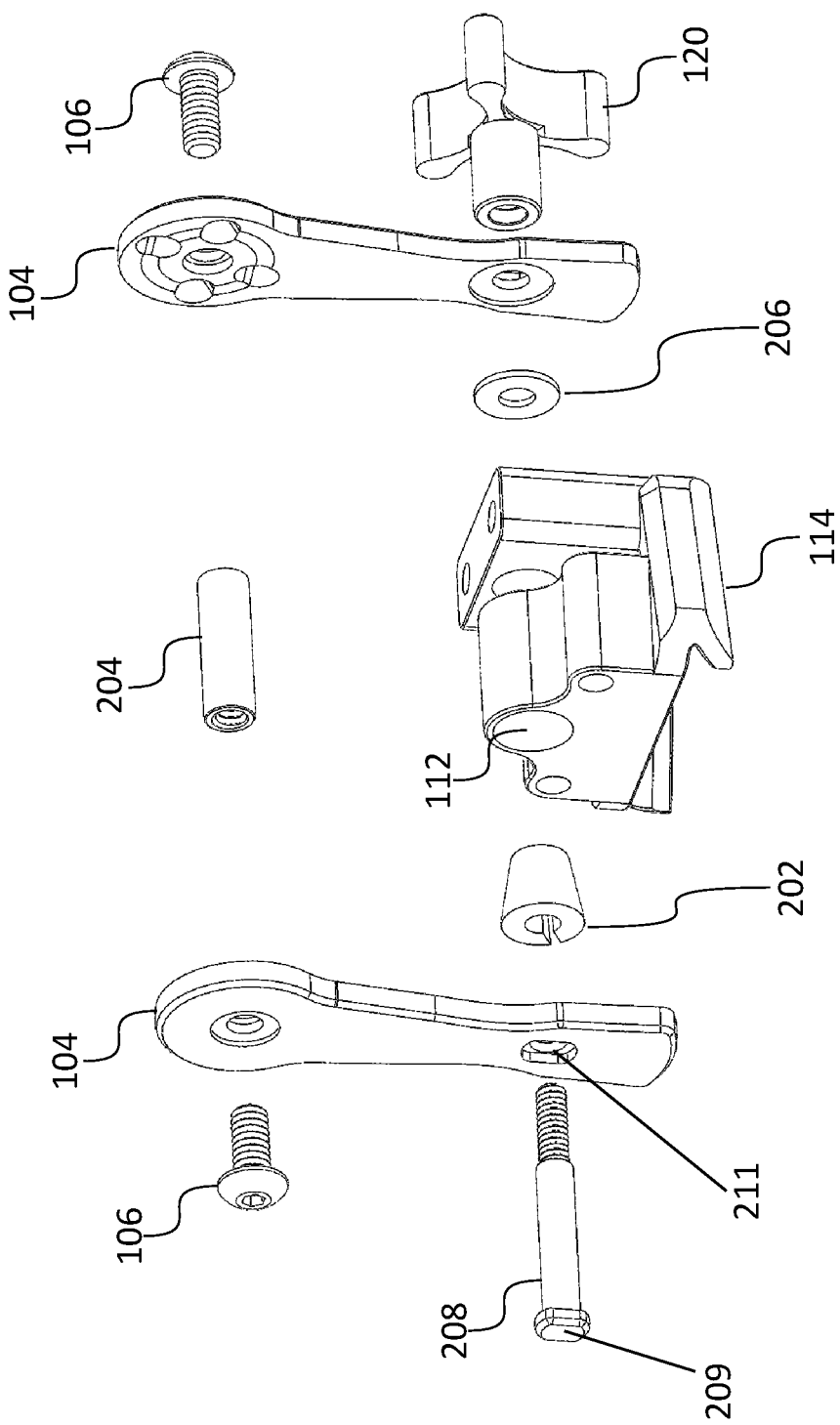

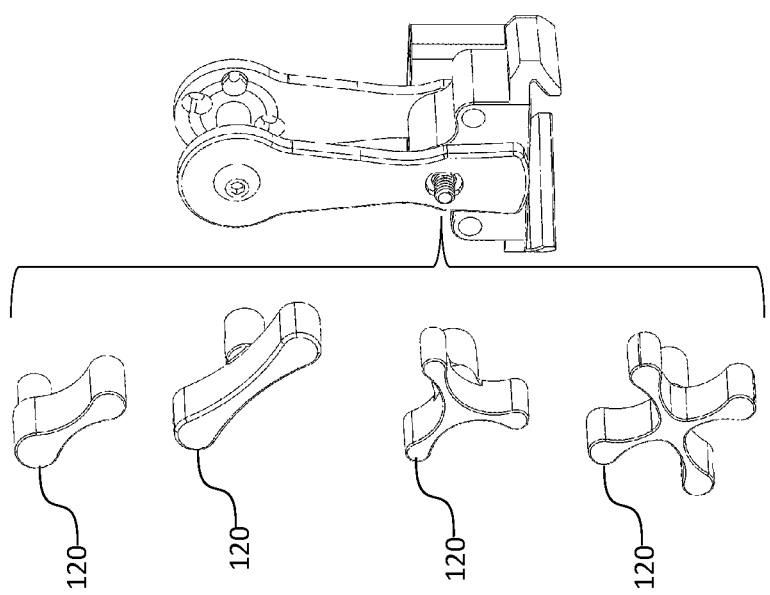

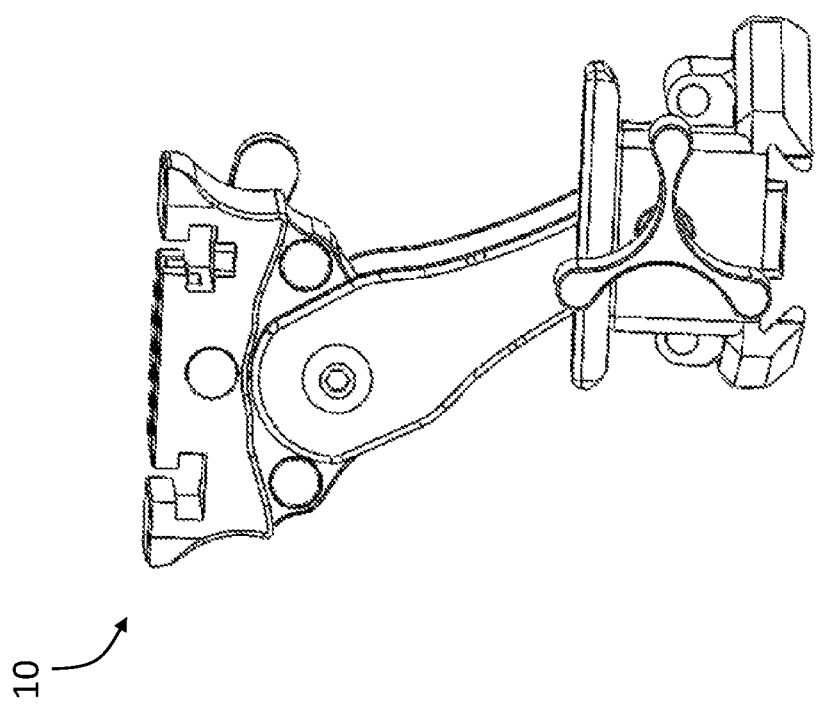

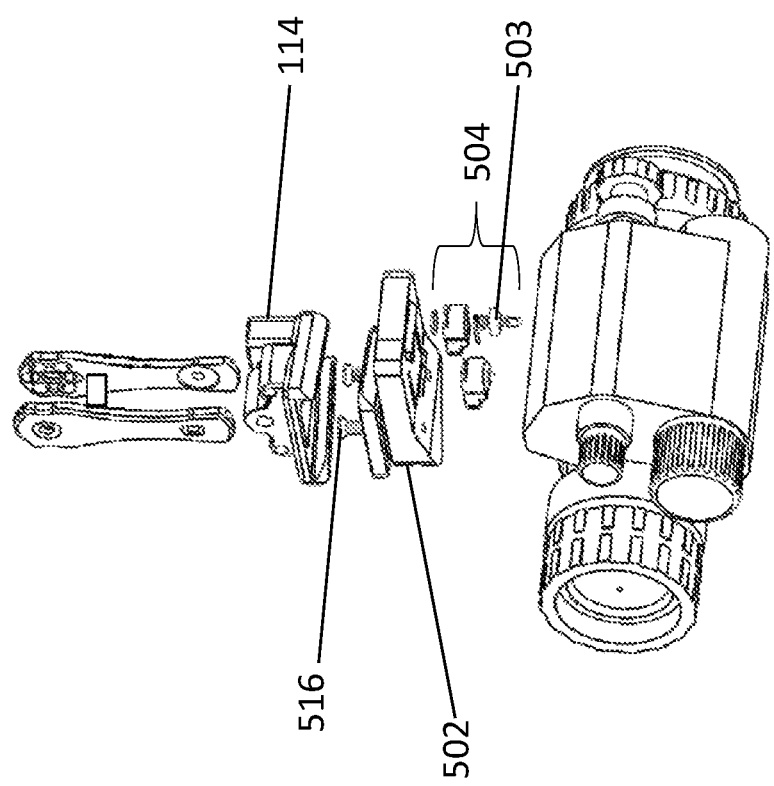

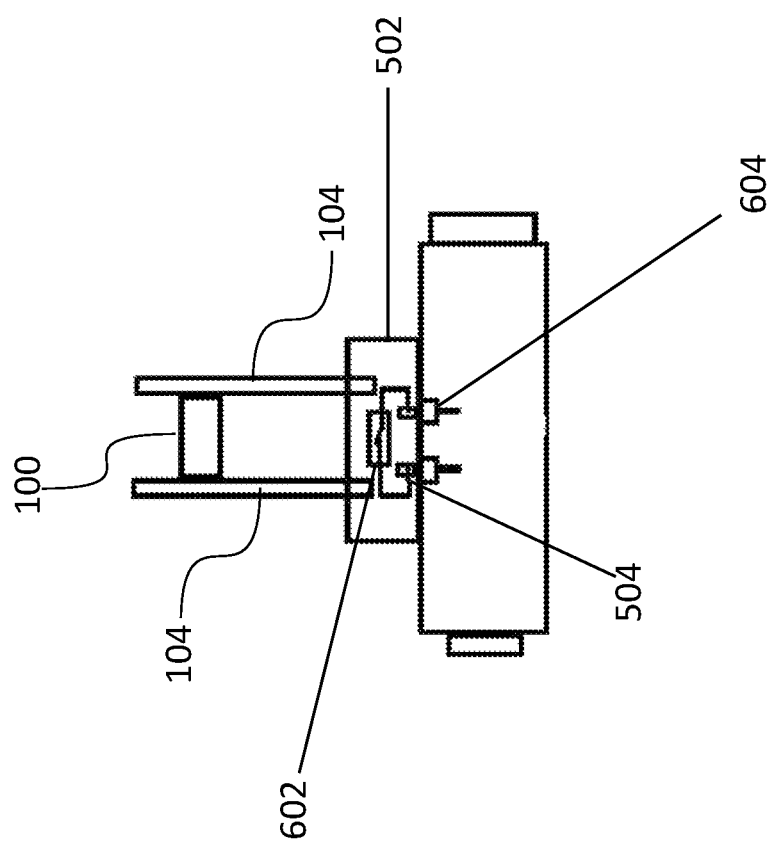

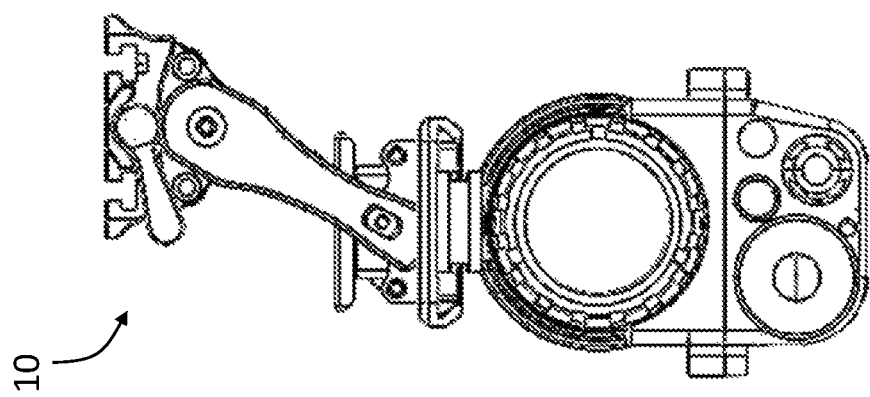

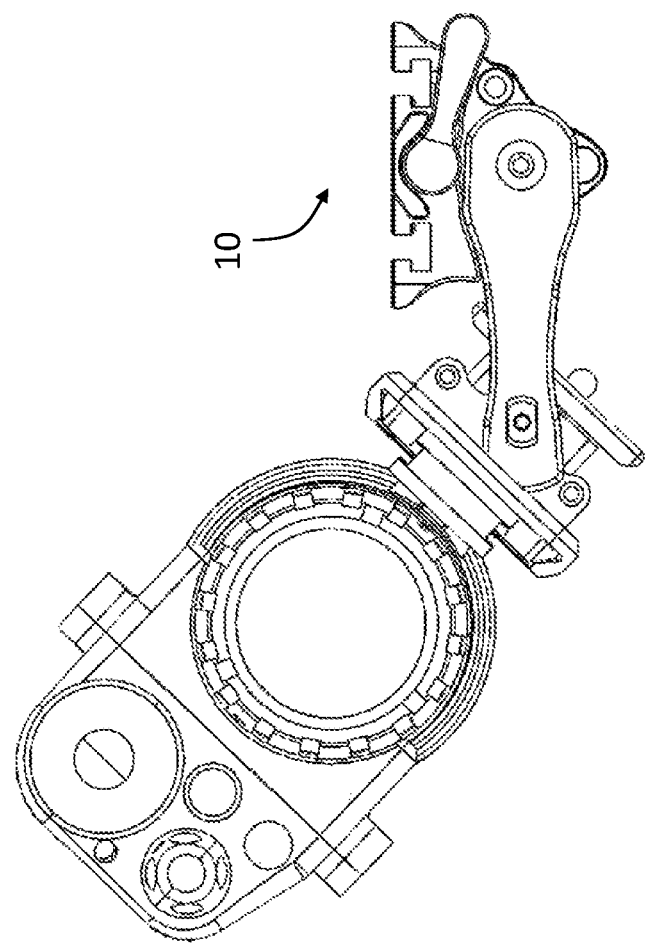

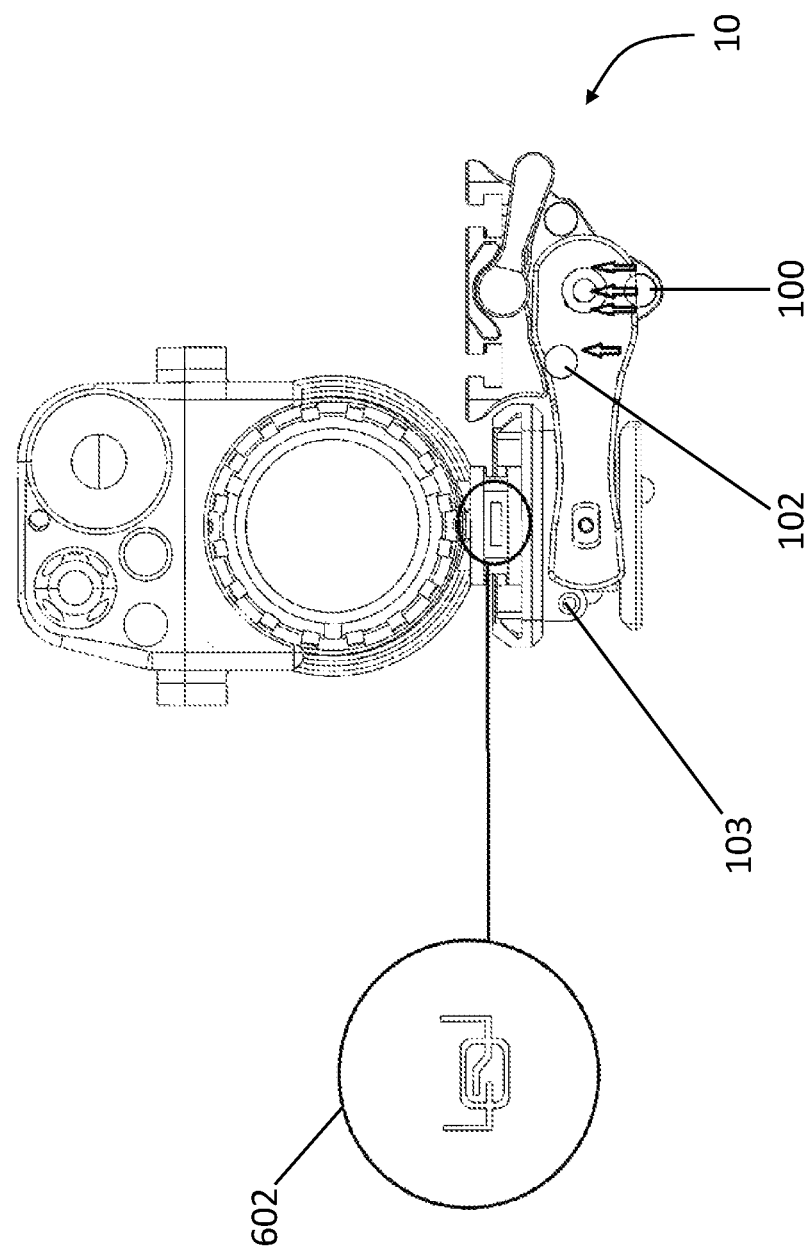

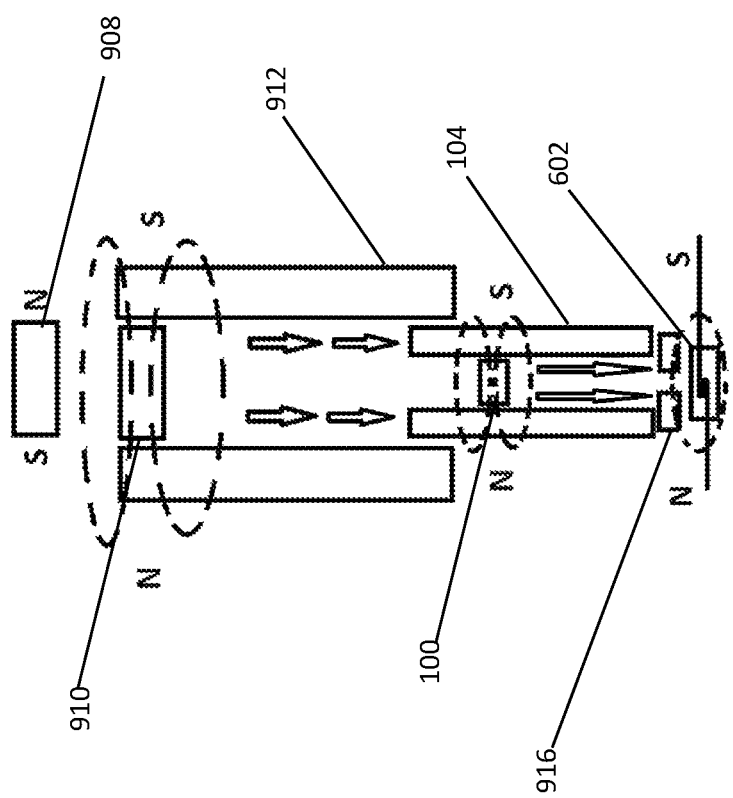

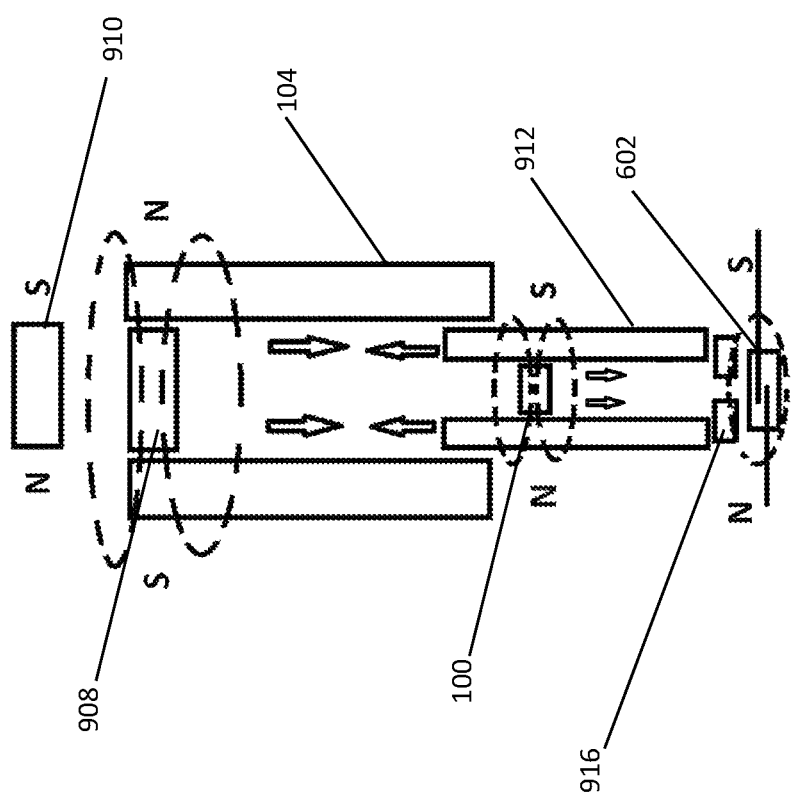

MAGNETIC SWITCH ADAPTER FOR NIGHT VISION GOGGLES

CROSS-REFERENCE TO RELATED APPLICATION(S)

This application claims the benefit of provisional Application No. 63/061,793 entitled MAGNETIC SWITCH ADAPTOR FOR NIGHT VISION GOGGLES, filed Aug. 5, 2020; and also claims the benefit of provisional Application No. 63/061,795 entitled MAGNETIC SWITCH ADAPTOR FOR NIGHT VISION GOGGLES, filed Aug. 6, 2020, both of which are hereby incorporated by reference for all purposes.

TECHNICAL FIELD

This disclosure relates generally to magnetically activated (or actuated) switches that use magnetic flux conveyed by flux conducting units from one or more magnets to actuate a magnetic sensor when certain physical alignments of the flux conducting units occur, and more particularly to a magnetically activated switch for a night vision goggle mount configured to activate or deactivate the night vision goggles depending on the positioning of the night vision goggles.

BACKGROUND

A magnetically activated switch assembly in a helmet mount for turning night vision goggles on and off is known in the art. Conventional magnetically activated switch assemblies utilize gravity in order to turn night vision goggles on and off. Such gravity controlled magnetically activated switch assemblies could cause integrated night vision goggles to improperly turn off when the night vision goggle apparatus is turned upside down. A non-gravity controlled magnetically activated switch assembly has been developed and is disclosed in U.S. Pat. No. 7,504,918B2, which was integrated into a monorail mount disclosed in U.S. Pat. No. 7,735,159B2, both references of which are incorporated herein by reference.

U.S. Pat. No. 7,504,918B2 discloses a non-gravity controlled magnetically activated switch assembly for integration into a helmet mount for turning night vision goggles on and off. The disclosed magnetically activated switch assembly includes a magnet with conductive flux members leading to a reed switch. When the conductive flux members line up with the north and south poles of the magnet, the reed switch turns on, which provides a current path to power the night vision goggles.

The disclosed magnetically activated switch assembly includes several air gaps between conductive flux members. The air gaps increase the reluctance of the magnetic flux path. With a higher reluctance magnetic flux path, the magnetically activated switch assembly is less effective because a more sensitive reed switch must be used. If the reed switch is too sensitive, the night vision goggles could be activated by the Earth's magnetic field or other environmental magnetic fields such as that caused by nearby power lines. Additionally, the need for air gaps within the magnetic flux path places limitations on the structures in which such a magnetic switch assembly may be embodied.

Accordingly, there is a need for an improved magnetic switch assembly that may utilize a lower reluctance magnetic flux path. Additionally, it is advantageous to embody a lower reluctance magnetic flux path within a magnetic flux circuit that offers increased versatility of design by providing functionality without reliance on components that increase/decrease air gap width.

SUMMARY

Embodiments of a night vision goggle adapter, a flux switch helmet mount assembly, and a dual night vision goggle adapter are described herein. As will be appreciated by one skilled in the art, the devices described herein could be utilized with any suitable optical device, such as, but not limited to, night vision goggles, infrared (IR) or thermal imagers, and hybrid or fused devices that combine night vision and thermal imaging. For simplicity of description, the disclosures hereafter will refer only to night vision goggles.

A night vision goggle adapter, according to some embodiments of the present disclosure, may include: a goggle mount assembly; a primary magnet generating a first magnetic flux; a magnetic flux conducting unit having a first end and a second end, wherein the first end is rotatable about a first axis positioned adjacent to the primary magnet and the second end is coupled to a second axis located within the goggle mount assembly about which the goggle mount assembly can rotate; a first plurality of shunts disposed about the primary magnet; and a second plurality of shunts disposed about the goggle mount assembly; wherein the magnetic flux conducting unit is configured to overlap the primary magnet and form a magnetic circuit for conducting the first magnetic flux towards the second end of the magnetic flux conducting unit when none of the first plurality of shunts and none of the second plurality of shunts are overlapped by the magnetic flux conducting unit; and wherein the first magnetic flux is shorted through one of the first plurality of shunts or the second plurality of shunts when the magnetic flux conducting unit is positioned such that one of the first plurality of shunts or one of the second plurality of shunts is overlapped by the magnetic flux conducting unit.

A night vision goggle adapter, according to some embodiments of the present disclosure, wherein the magnetic flux conducting unit includes a pair of magnetic flux conducting units, each having a top portion and a bottom portion, configured to be rotatably coupled to the first axis at the top portion of each of the pair of magnetic flux conducting units and coupled to the second axis at the bottom portion of each of the pair of magnetic flux conducting units.

A night vision goggle adapter, according to some embodiments of the present disclosure, may further include: an interpupillary adjustment (IPA) torque adjustment knob; a threaded member configured to fit within the goggle mount assembly along the second axis; and a compression component; wherein the IPA torque adjustment knob may be threaded along the threaded member to increase force applied to the compression component creating an increased frictional force about the second axis that inhibits rotation of the magnetic flux conducting unit about the second axis.

A night vision goggle adapter, according to some embodiments of the present disclosure, wherein the compression component includes one or more thrust washers.

A night vision goggle adapter, according to some embodiments of the present disclosure, wherein the compression component includes a split conical bushing.

A night vision goggle adapter, according to some embodiments of the present disclosure, wherein the goggle mount assembly includes a spring-loaded locking member.

A night vision goggle adapter, according to some embodiments of the present disclosure, further including a helmet mount assembly, wherein the first axis is located within the helmet mount assembly.

A night vision goggle adapter, according to some embodiments of the present disclosure, wherein the first plurality of shunts are displaced within the helmet mount assembly about the first axis.

A night vision goggle adapter, according to some embodiments of the present disclosure, may further include: an array of detents on the helmet mount assembly and located about the first axis; and a plurality of spring-loaded balls; wherein the spring-loaded balls are configured to be compressed between the magnetic flux conducting unit and the helmet mount assembly; and wherein the spring-loaded balls are configured to fit partially within the detents causing the magnetic flux conducting unit to be retained at an angular position relative to the helmet mount assembly until a rotational force is applied to the magnetic flux conducting unit sufficient to overcome the force retaining at least one of the plurality of spring loaded balls within one of the array of detents.

A night vision goggle adapter, according to some embodiments of the present disclosure, wherein the location of the array of detents corresponds to at least one position wherein the magnetic flux conducting unit does not overlap one of the first plurality of shunts; and wherein the location of the array of detents also corresponds to at least one position wherein the magnetic flux conducting unit does overlap at least one of the first plurality of shunts.

A flux switching helmet mount assembly, according to some embodiments of the present disclosure, includes: a mounting base having: a central axis; a booster magnet positioned about the central axis and a first polar orientation; and a suppressor magnet positioned about the central axis and displaced from the booster magnet and having a second polar orientation; a magnetic flux conducting rail assembly; and a mounting point coupled to the mounting base; wherein the magnetic flux conducting rail assembly is configured to be rotatably coupled to the central axis and is further configured to overlap the booster magnet in a first position and conduct a magnetic flux according to the first polar orientation along the magnetic flux conducting rail assembly; and wherein the magnetic flux conducting rail assembly is configured to overlap the suppressor magnet in a second position and conduct a magnetic flux according to the second polar orientation along the magnetic flux conducting rail assembly.

A flux switching helmet mount assembly, according to some embodiments of the present disclosure, may further include: a slidable flux conducting unit configured to couple to the magnetic flux conducting rail assembly and slide along a portion of the magnetic flux conducting rail assembly.

A flux switching helmet mount assembly, according to some embodiments of the present disclosure, wherein the base further includes: a first lobe configured to house the booster magnet; and a second lobe configured to house the suppressor magnet.

A flux switching helmet mount assembly, according to some embodiments of the present disclosure, wherein the base further includes: a locking mechanism configured to selectively retain the magnetic flux conducting rail assembly in the first position or the second position.

A flux switching helmet mount assembly, according to some embodiments of the present disclosure, wherein the magnetic flux conducting rail assembly includes at least two magnetic flux conducting rails.

A night vision goggle adapter, according to some embodiments of the present disclosure, includes: a first goggle mount assembly; a first magnet generating a first magnetic flux; and a first magnetic flux conducting unit having a first end and a second end, wherein the first end is rotatable about a first axis positioned adjacent to the first magnet and the second end is coupled to a second axis located within the first goggle mount assembly about which the first goggle mount assembly can rotate; wherein the first magnetic flux conducting unit is configured to overlap the first magnet and form a first magnetic circuit for conducting the first magnetic flux towards the second end of the first magnetic flux conducting; and wherein the first magnetic flux conducted through the first magnetic circuit is reduced when the first magnetic flux conducting unit is positioned such that the first magnet is not overlapped by the first magnetic flux conducting unit.

A night vision goggle adapter, according to some embodiments of the present disclosure, may further include: a first shunt positioned about the second axis within the first goggle mount assembly; wherein the first magnetic flux is shorted through the first shunt when the first magnetic flux conducting unit is positioned relative to the first goggle mount assembly such that the first shunt is overlapped by the first magnetic flux conducting unit.

A night vision goggle adapter, according to some embodiments of the present disclosure, may further include: a second goggle mount assembly; a second magnet generating a second magnetic flux; a second magnetic flux conducting unit having a third end and a fourth end, wherein the third end is rotatable about a third axis positioned adjacent to the second magnet and the fourth end is coupled to a fourth axis located within the second goggle mount assembly about which the second goggle mount assembly can rotate; and wherein the second magnetic flux conducting unit is configured to overlap the second magnet and form a second magnetic circuit for conducting the second magnetic flux towards the fourth end of the second magnetic flux conducting unit; and wherein the second magnetic flux conducted through the second magnetic circuit is reduced when the second magnetic flux conducting unit is positioned such that the second magnet is not overlapped by the second magnetic flux conducting unit.

A night vision goggle adapter, according to some embodiments of the present disclosure, further including: a second shunt positioned about the fourth axis within the second goggle mount assembly; wherein the second magnetic flux is shorted through the second shunt when the second magnetic flux conducting unit is positioned relative to the second goggle mount assembly such that the second shunt is overlapped by the second magnetic flux conducting unit.

A night vision goggle adapter, according to some embodiments of the present disclosure, may further include: a first secondary shunt positioned about the first axis and configured to short the first magnetic flux being conducted within the first magnetic circuit when the first magnetic flux conducting unit is positioned such that the first magnetic flux conducting unit overlaps the first secondary shunt.

A night vision goggle adapter, according to some embodiments of the present disclosure, may further include: a second secondary shunt displaced about the third axis and configured to short the second magnetic flux being conducted within the second magnetic circuit when the second magnetic flux conducting unit is positioned such that the second magnetic flux conducting unit overlaps the second secondary shunt.

A night vision goggle adapter, according to some embodiments of the present disclosure, may further include: a ridge positioned between the first axis and the third axis and configured to mechanically limit the rotation of the first magnetic flux conducting unit about the first axis and mechanically limit the rotation of the second magnetic flux conducting unit about the third axis such that a minimum distance between the first goggle mount assembly and the second goggle mount assembly is maintained.

BRIEF DESCRIPTION OF THE DRAWINGS

The features and advantages of embodiments of the present disclosure will become more apparent by reference to the following detailed description when considered in conjunction with the following drawings. The figures are not necessarily drawn to scale.

FIG. 2B is an exploded view of a night vision goggle adapter including a split conical bushing according to one embodiment of the present disclosure.

FIG. 2C is a depiction of alternative interpupillary adjustment (IPA) torque adjustment knobs that may be used with a night vision goggle adapter according to one embodiment of the present disclosure.

FIG. 4C is a prospective view from a rearward angle of a night vision goggle adapter in a right eye use position according to one embodiment of the present disclosure.

FIG. 5 is an exploded view of a night vision goggle adapter according to one embodiment of the present disclosure.

FIG. 6 is a simplified depiction of a magnetic switch circuit according to one embodiment of the present disclosure.

FIG. 7A is a frontal view of a night vision goggle adapter coupled to a night vision goggle in a right eye use position according to one embodiment of the present disclosure.

FIG. 7C is a frontal view of a night vision goggle adapter coupled to a night vision goggle in a right eye secondary stow position according to one embodiment of the present disclosure.

FIG. 8C is a frontal view of a night vision goggle adapter coupled to a night vision goggle in a right eye tertiary stow position including arrows depicting the direction of magnetic flux flow and a representation of the approximate location and state of the magnetic switch in a right eye tertiary stow position according to one embodiment of the present disclosure.

FIG. 10 is a simplified diagram of a magnetic flux circuit including flux switching magnets representing the magnetic flux reaching a magnetic switch in a use position according to one embodiment of the present disclosure.

FIG. 11 is a simplified diagram of a magnetic flux circuit including flux switching magnets representing the magnetic flux reaching a magnetic switch in a stow position according to one embodiment of the present disclosure.

DETAILED DESCRIPTION

Figure 1:
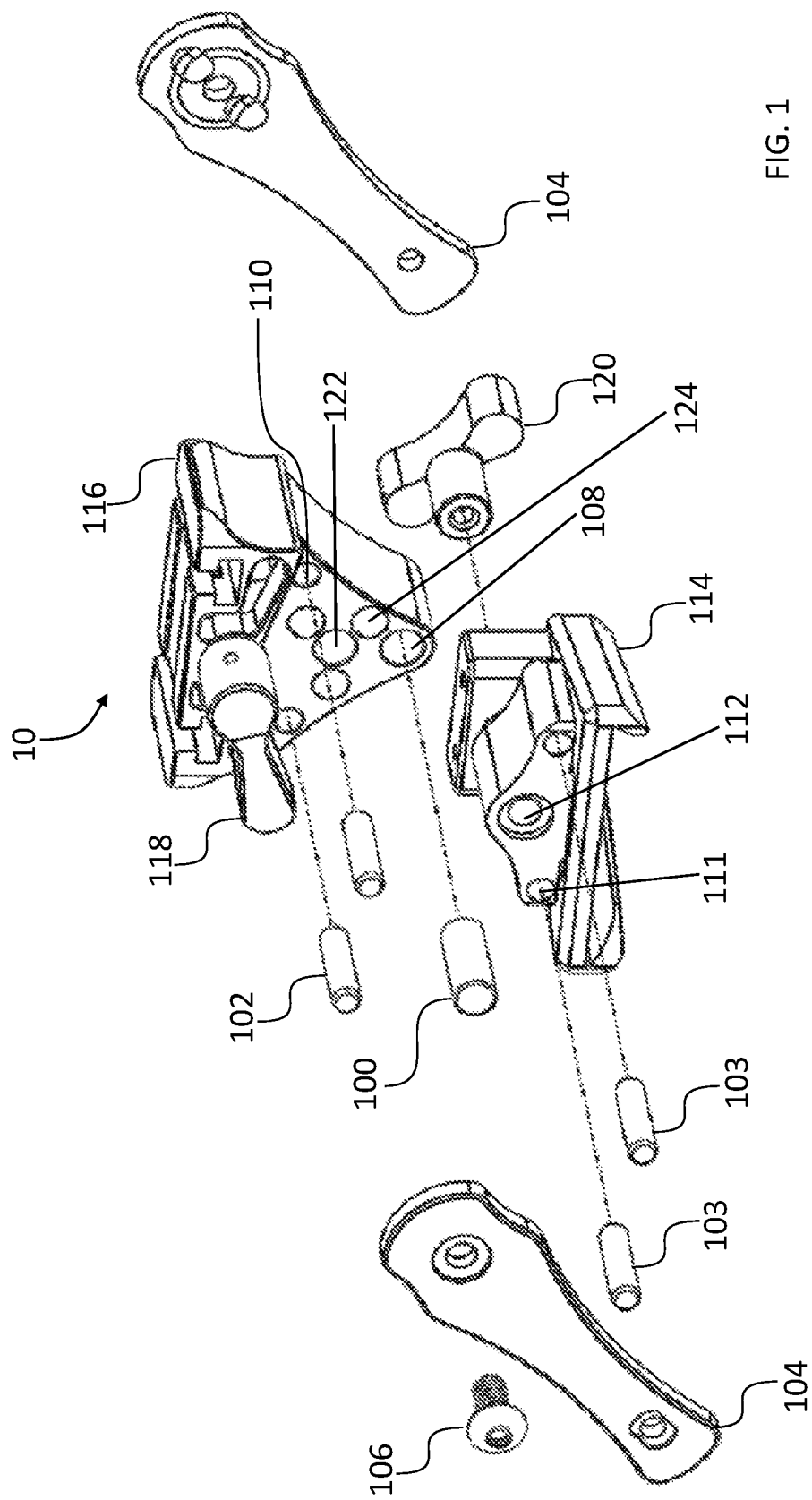
FIG. 1 is an exploded view of a night vision goggle adapter according to one embodiment of the present disclosure.

Features of the inventive concept and methods of accomplishing the same may be understood more readily by reference to the following detailed description of embodiments and the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

A magnetically activated switch may be controlled according to the relative positions of associated magnetic flux-affecting components. For example, a magnetically activated switch may be activated based on the position of one or more devices such as one or more magnets, one or more magnetic flux conducting units, one or more flux shunts, and a magnet sensor.

In some embodiments the magnetically activated switch uses magnetic flux from a permanent magnet to actuate a magnet sensor when a sufficiently large amount of magnetic flux produced by the permanent magnet is present at the magnet sensor. In some embodiments a magnet sensor may be actuated by moving one or more magnetic flux conducting units and/or flux shunts that alter the path of the magnetic flux within the magnetic circuit, and alter the corresponding magnitude of the magnetic flux presented to the magnet sensor. Some embodiments of the present disclosure use a type of magnet sensor called a reed switch. In some embodiments, reed switches that are closed only in the presence of a sufficiently strong magnetic field are used. The reed switches may have various operating parameters, as will be appreciated by one skilled in the art. In some embodiments, reed switches may be specified at 10-15 ampere turns, which may be used with a magnet that provides between 10-25 gauss magnetic field at the location of the reed switch. However, as will be appreciated by one skilled in the art, various combinations of reed switches and magnets, having different sensitivities and strengths, respectively, may be used within the scope of the present disclosure.

In conventional magnetic switches, the accuracy of position sensing has been generally poor as position sensing is strongly dependent on the field strength of the magnet which varies over temperature, initial magnetization, and the sensitivity of the magnet sensor. Furthermore, certain magnetic switch applications require careful balancing of the flux fields of multiple magnets to achieve their desired results. In some embodiments of the present disclosure, these variables that diminish accuracy of position sensing within the magnetic switch may be mitigated through the use of components that can conduct magnetic flux from a magnet to a magnetic sensor, such as a reed switch.

According to Maxwell's equations, magnetic flux always forms a closed loop. However, the path of the closed loop depends on the reluctance of the materials surrounding the magnet. That is, a magnetic circuit/flux path of low reluctance materials may be used to direct magnetic flux in a particular path. The reluctance of such a magnetic circuit is proportional to the length of the circuit and is inversely proportional to the magnetic permeability of the material used in the circuit and the cross-sectional area of the circuit. Thus, magnetic switch assemblies may be embodied that include a low-reluctance magnetic flux path to manipulate the flow of magnetic flux within the magnetic switch assembly.

Through the addition of magnetic flux conducting units, that may alter the path taken by the magnetic flux of a magnet within a magnetic switch assembly, performance and reliability of the magnetically activated switch assembly may be improved. Magnetic flux conducting units may be embodied using various materials having a relatively high magnetic permeability. These materials may include, but are not limited to: magnetic metals such as iron, ferrite, soft steel, etc.; Mu-metal; Permalloy; iron-nickel alloy; silicon steel; carbon steels (such as AISI 12L14 carbon steel); and nickel. Magnetic flux conducting units manufactured from one or more of these materials may also include plating by any suitable material, such as nickel. In some embodiments, the magnetic flux conducting units may be preferably embodied using magnetically "soft" metals, i.e., metals in which a magnetic field induced within the metal by the presence of a magnet quickly collapses when the magnet is removed or shielded from the metal.

One such use for a magnetically activated switch is to activate/deactivate night vision goggles (NVG) mounted on a helmet mount. The helmet mount may incorporate a magnetically activated switch to activate the NVG when the NVG are in an in-use position and to deactivate the NVG when they are in a stowage position. Of course, a magnetically activated switch may also be useful in other interfaces where the components of the interface move with respect to one another and where the position of the switch is determined by the relative location of the components of the interface with respect to one another.

The magnetically activated switch, according to one or more embodiments of the present disclosure, is designed to conduct enough flux from the magnet to a magnet sensor, such as a reed switch, to activate the switch. Additionally, the magnetically activated switch provides alternate magnetic flux paths of different magnetic reluctance that may vary the amount of magnetic flux presented to the magnet sensor. In one embodiment, by providing pairs of magnetic flux conducting units (one for the flux to the magnet sensor and the other as a return path to the magnet), hereinafter such a pair of flux conducting units may be referred to as a flux conducting unit, and a plurality of flux shunts that may serve as alternative paths for conducting the magnetic flux when one of the plurality of flux shunts is located between the pair of magnetic flux conducting units, a magnetically activated switch assembly may be operated by varying the positioning of the magnetic flux conducting units. In other words, the flow of magnetic flux through a given magnetic circuit/switch moves through a magnetic flux conducting unit towards a magnet sensor and then returns to the source in a closed loop through the return path of the magnetic flux conducting unit unless one or more flux shunts are overlapped by the magnetic flux conducting unit such that a "short" (much lower reluctance) path is created that prevents the magnetic flux from reaching the magnet sensor. Furthermore, providing a pair of magnetic flux conducting units allows the magnetically activated switch to work over a wide temperature range despite permanent magnet strength variations over temperature and varying magnet sensor sensitivity.

In addition to the use of flux conductors, exemplary embodiments of the present invention may include a plurality of flux shunts. By moving the flux conductors into alignment with an adjacent flux shunt, or vice versa, at least a portion of the flux may be shorted through an alternate path when a shunt is overlapped by a magnetic flux conducting unit, thus removing most of the magnetic flux from the magnet sensor. In some embodiments, the reduction in the magnetic flux presented to the magnet sensor may be sufficient to prevent the actuation of the magnet sensor by the magnetic flux from the magnet.

As discussed above, the reluctance of a magnetic circuit is proportional to the length of the circuit and is inversely proportional to the magnetic permeability of the material used in the circuit and the cross-sectional area of the circuit. As such, various modifications to the exemplary embodiments described herein may be made in order to decrease the length of the circuit, increase the magnetic permeability of the circuit, or increase the cross-sectional area of the circuit. Furthermore, because the weight of the magnetic circuit may also be an important consideration, various modifications to the exemplary embodiments of the magnetic circuits described herein may be made to alter the weight of the magnetic circuit in view of the reluctance of the magnetic circuit. For example, a heavier material of a higher magnetic permeability may be used for the magnetic circuit, while decreasing the cross-sectional area of the circuit, such that a total weight of the magnetic circuit is reduced while achieving a lower reluctance of the magnetic circuit.

FIG. 1 is an exploded view of a night vision goggle adapter 10 according to one embodiment of the present disclosure. A magnet 100 is shown in a cylindrical shape according to an embodiment of the present disclosure. The magnet 100 may be produced from various magnetic materials, such as ferrous materials, cobalt, nickel, neodymium, and Alnico or various other alloys as would be known to one skilled in the art. In regards to the strength of the magnet, some embodiments may use magnets capable of providing a magnetic field of 10-25 gauss at the magnet sensor. The magnet 100 may be of any strength suitable to meet the magnetic flux magnitude needs of a specific embodiment as will be appreciated by one skilled in the art. The magnet 100 is intended to fit within a magnet housing 108 of a helmet mount assembly 116. As will be understood by one skilled in the art, the shape, dimensions, composition, and strength of the magnet 100 may be varied to meet the needs of different designs and/or components. Likewise, the size and shape of the magnet housing 108 may be varied to accommodate different magnets 100 within the scope of the present disclosure. The magnet housing 108 may be formed of a low magnetic permeability metal or plastic such as aluminum, nylon, or a polyimide thermoplastic resin such as Ultem® or Grivory®. Ultem® is a registered trademark of General Electric. Grivory® is a registered trademark of EMS-GRIVORY. Other materials of suitable strength and magnetic permeability as would be known to one skilled in the art may be used within the scope of the present disclosure.

A first plurality of flux shunts 102 are depicted and each flux shunt 102 of the first plurality corresponds to one of a first plurality of flux shunt housings 110. The first plurality of flux shunt housings 110 may be embodied in the helmet mount assembly 116. A second plurality of flux shunts 103 may be used, in some embodiments, and each of the second plurality of flux shunts 103 may correspond to one of a second plurality of flux shunt housings 111. The second plurality of flux shunt housings may be embodied within a goggle mount assembly 114. The flux shunts of the first plurality of flux shunts 102 are sized to fit within the first plurality of flux shunt housings 110. Similarly, the flux shunts of the second plurality of flux shunts 103 are sized to fit within the second plurality of flux shunt housings 111. As will be understood by one skilled in the art, the size and shape of the flux shunts (102 and 103) and flux shunt housings (110 and 111) may be varied to meet different design needs.

Magnetic flux conducting unit 104, shown as a pair but referred to herein as a magnetic flux conducting unit, may be rotatably coupled at a first end to the helmet mount assembly 116 at a first axis 122 using a retention bolt 106 and at a second end to the goggle mount assembly 114 at a second axis 112 using another bolt or threaded member assembly (not shown). Some embodiments may include both of these rotatable couplings to provide an axis of rotation for the magnetic flux conducting unit 104 about the first axis 122, and to provide an axis of rotation for the goggle mount assembly 114 about the second axis 112. Other embodiments may include only one rotatable coupling and thereby omit one axes of rotation. Various lockable positions may be made available about the first retention unit using, in some embodiments, an array of detents 124 and spring-loaded balls (not shown). The location of the detents 124 about the first axis 122 may be configured to allow for the retention of the magnetic flux conducting unit 104 in various positions. These positions may, in some embodiments, correspond to "use" and "stow" positions for the night vision goggle adapter 10. The size and composition of the springs and balls may be varied to meet different design needs of different embodiments of the night vision goggle adapter 10, such as increasing the pressure exerted on the balls by the springs in order to increase the amount of force required to displace the balls from the detents 124. Likewise, the geometry and depth of the detents 124 can be changed to vary the amount of force required to displace a retained ball from the detents 124. In some embodiments, detents 124 having angular walls corresponding to tangent points along the surfaces of the spring-loaded balls may be used, as this may allow for increased wear resistance and increased security, i.e., less variability, in the retention of the spring-loaded balls within the detents 124. In some embodiments, the use of detents 124 to determine the positions that the magnetic flux conducting unit 104 may be retained is beneficial for helping a user quickly determine if the rotation of the magnetic flux conducting unit 104 has been sufficient to reach the next retention position by providing a mechanical haptic, or "click" that a user may feel. With respect to the use of a detent 124 array, one skilled in the art will appreciate the variations of such arrays that may be used within the scope of the present disclosure.

A fore/aft adjustment lever 118 may be included in the night vision goggle adapter 10 to allow for adjustment of a connection between the night vision goggle adapter 10 and a helmet mount (not shown). This fore/aft adjustment lever 118 may, in some embodiments, be used to adjust an amount of force applied by a locking mechanism to a structure that the night vision goggle adapter 10 is coupled to. The locking mechanism may, in some embodiments, allow for the retention of the night vision goggle adapter 10 to the helmet mount assembly (not shown) by increasing the amount of frictional force applied by the locking mechanism to the helmet mount assembly (not shown) when the fore/aft adjustment lever 118 is rotated. With respect to these types of mechanisms, one skilled in the art will appreciate the variations of such mechanisms that could be used within the scope of the present disclosure to meet varying design needs.

An interpupillary adjustment (IPA) torque adjustment knob 120 may also be included and connected to the second axis 112 to allow for variation of the torque required to rotate the goggle mount assembly 114 about the second axis 112. This adjustability may allow for a reduction in the torque required to rotate the goggle mount assembly 114 that provides for easier fine adjustment of the placement of the night vision goggle (not shown) relative to a pupil of a user, and also allow for an increase in the torque required to rotate the goggle mount assembly 114 that may facilitate retention of the position set by a user. Further depiction of the IPA torque adjustment knob 120 can be found in FIGS. 2A-C which depict exploded views of some of the components of the goggle mount assembly 114 including those related to the IPA torque adjustment knob 120, as well as various embodiments of the IPA torque adjustment knob 120.

The IPA torque adjustment knob 120 may be configured to screw along a threaded member (208 of FIG. 2A) that has flattened ends to ensure that it cannot freely rotate within the second axis 112. Tightening the IPA torque adjustment knob 120 causes it to push against a compression component (not shown). In some embodiments, the compression component may be one or more thrust washers (302 of FIG. 3). The compression component will be described in more detail below in relation to FIGS. 2A-C and 3. Increased force applied to the compression component increases the friction between the compression component and the magnetic flux conducting units 104 or along the threaded member (208 of FIG. 2A). This allows for a frictional force between the compression component and the magnetic flux conducting units 104 or a frictional force about the second axis 112 to hold the orientation of the goggle mount assembly 114 relative to the magnetic flux conducting units 104 when tightened, or, at lesser pressures, increase the control a user has over positioning the night vision goggle device. Additionally, the angular position of the goggle mount assembly 114 is infinitely adjustable about the second axis 112 within its range of motion. As will also be appreciated by those skilled in the art, a balance between the forces required to overcome the detents 124 (described above) and the force required to overcome the frictional force controlled by the IPA torque adjustment knob 120 may, in some embodiments, be achievable such that a user can with one hand finely adjust the interpupillary position of a night vision goggle device or reposition the night vision goggle device into a stow position. Thus, in some embodiments, the IPA torque adjustment knob 120 may be used in conjunction with the detents 124 to facilitate one-handed operation of the device of the present disclosure.

Figure 2A:
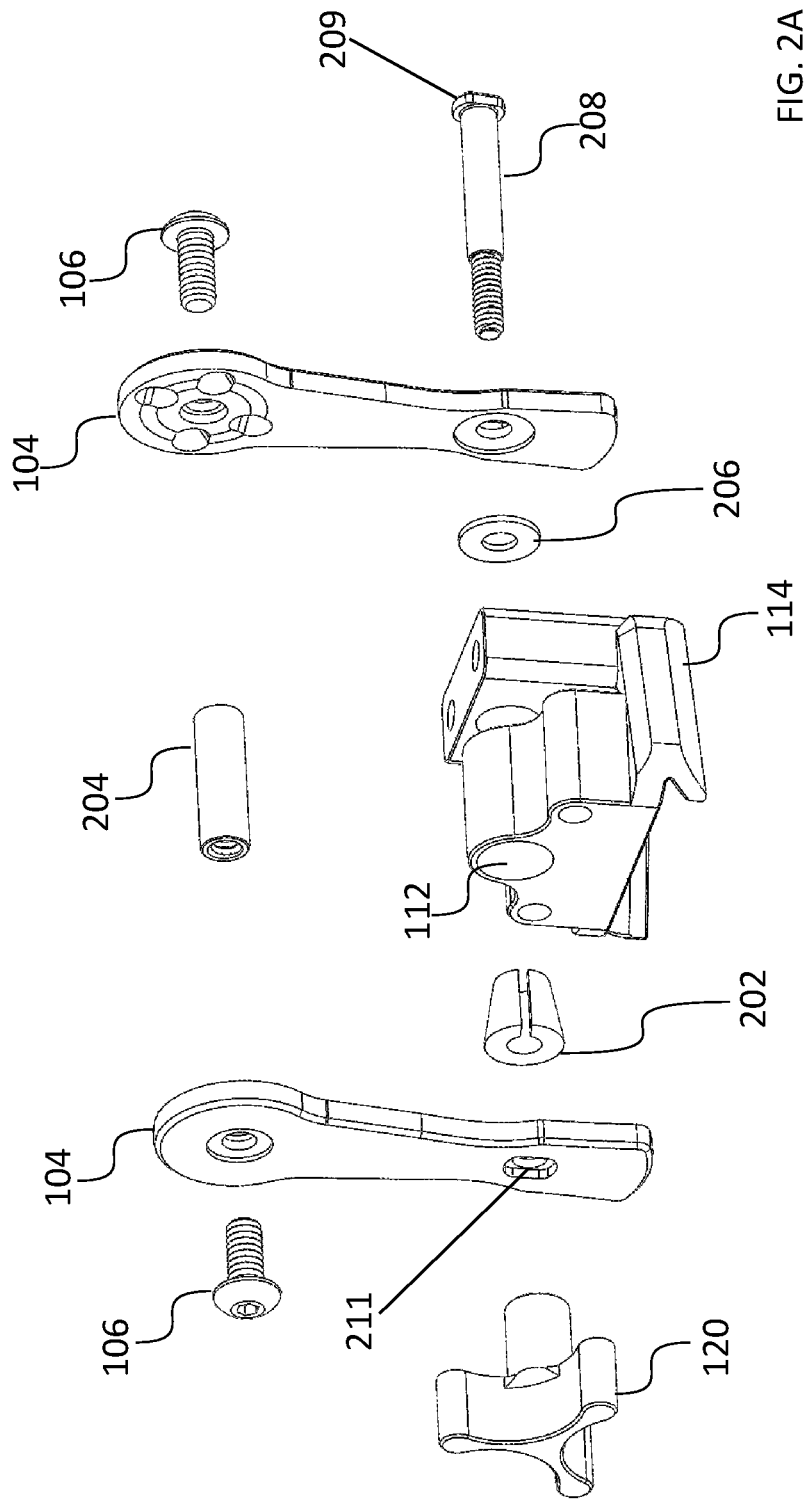
FIG. 2A is an exploded view of a night vision goggle adapter including a split conical bushing according to one embodiment of the present disclosure.

FIG. 2A is an exploded view of a night vision goggle adapter 10, with some components omitted for clarity, according to one embodiment of the present disclosure. A retention unit 204 may be used within the night vision goggle adapter 10 by extending through the body of the helmet mount assembly 116 (not shown) along the first axis 122. The retention unit 204 may be threaded at one or both ends and configured to have a means for retaining one or more retention bolts 106. The retention means may include, but is not limited to, mated threads or other structures, like a "bayonet" mount, that may secure the retention unit 204 to the one or more retention bolts 106. Any suitable retention means may be used within the scope of the present disclosure, and the use of different variations of these retention means to meet various design constraints will be appreciated by one skilled in the art.

The IPA torque adjustment knob 120 is shown in alignment, along a path corresponding to the second axis 112 described above in regards to FIG. 1, with a split conical bushing 202, a washer 206, and a threaded member 208. The threaded member 208 includes a flattened end 209 that is configured to be retained by a corresponding recess 211 on the magnetic flux conducting unit 104. As described above, these components, when coupled along the second axis 112 allow for an increased amount of frictional force to be exerted along the threaded member 208 when the IPA torque adjustment knob 120 is turned along the threads of the threaded member 208 without the use of additional tools. This increased friction provides for control of the positioning of the goggle mount assembly 114 about the second axis 112 and retains the position of the goggle mount assembly 114 as set by a user. The flattened end 209, when retained within the corresponding recess 211 of the magnetic flux conducting unit 104 prevents the threaded member 208 from rotating during rotation of the IPA torque adjustment knob 120 and, thus, facilitates the increase or decrease of friction about the threaded member 208. Adjustment to the position of the goggle mount assembly 114 can be made by applying a sufficient amount of torque to overcome the frictional force applied along the second axis 112, and turning the IPA torque adjustment knob 120 in a reverse direction along the threads of the threaded member 208 decompresses the conical bushing 202 and makes adjustment easier. Likewise, the position of the goggle mount assembly 114 can be retained by turning the IPA torque adjustment knob 120, i.e. along the threads of the threaded member 208. For example, in some embodiments, turning the IPA torque adjustment knob 120 in a clockwise direction may increase the frictional force, and a rotation in a counter-clockwise direction may reduce the frictional force applied. In some embodiments, using this type of componentry, the positioning of the goggle mount assembly 114 is infinitely adjustable within its range of motion. In some embodiments, the amount of frictional force may be varied to control the position of a night vision goggle device either by being of high enough magnitude to generally retain the night vision goggle in place, or by being only of sufficient magnitude to make it more difficult to rotate during one-handed operation. Additionally, the use of friction to control the position of the night vision goggle device can allow for impacts to displace the device, which may, in some instances, prevent breakage of the device or reduce an amount of force transferred from the impact to the user.

FIG. 2B is an exploded view of a night vision goggle adapter including a split conical bushing, according to one embodiment of the present disclosure, with the orientation of the components arranged along the second axis 112 reversed. The placement of the IPA torque adjustment knob 120 can be reversed according to user preference. The operation of these components remains the same, but IPA torque adjustment knob 120 may be placed in a rearward facing (while in a use position) configuration.

FIG. 2C is a depiction of alternative interpupillary adjustment (IPA) torque adjustment knobs that may be used with a night vision goggle adapter according to one embodiment of the present disclosure. As shown, the IPA torque adjustment knob 120 may be embodied in various shapes that provide one or more contact surfaces for a user. The contact surfaces may be, in some embodiments, lobes or extensions that provide a lever arm for turning the IPA torque adjustment knob 120. As shown, embodiments including single, double, triple, and quadruple contact surfaces may be used within the scope of the present disclosure. Likewise, as will be appreciate by one skilled in the art, the length of the contact surfaces, as well as any texturing of the contact surfaces, may be varied according the needs of a user.

Figure 3:
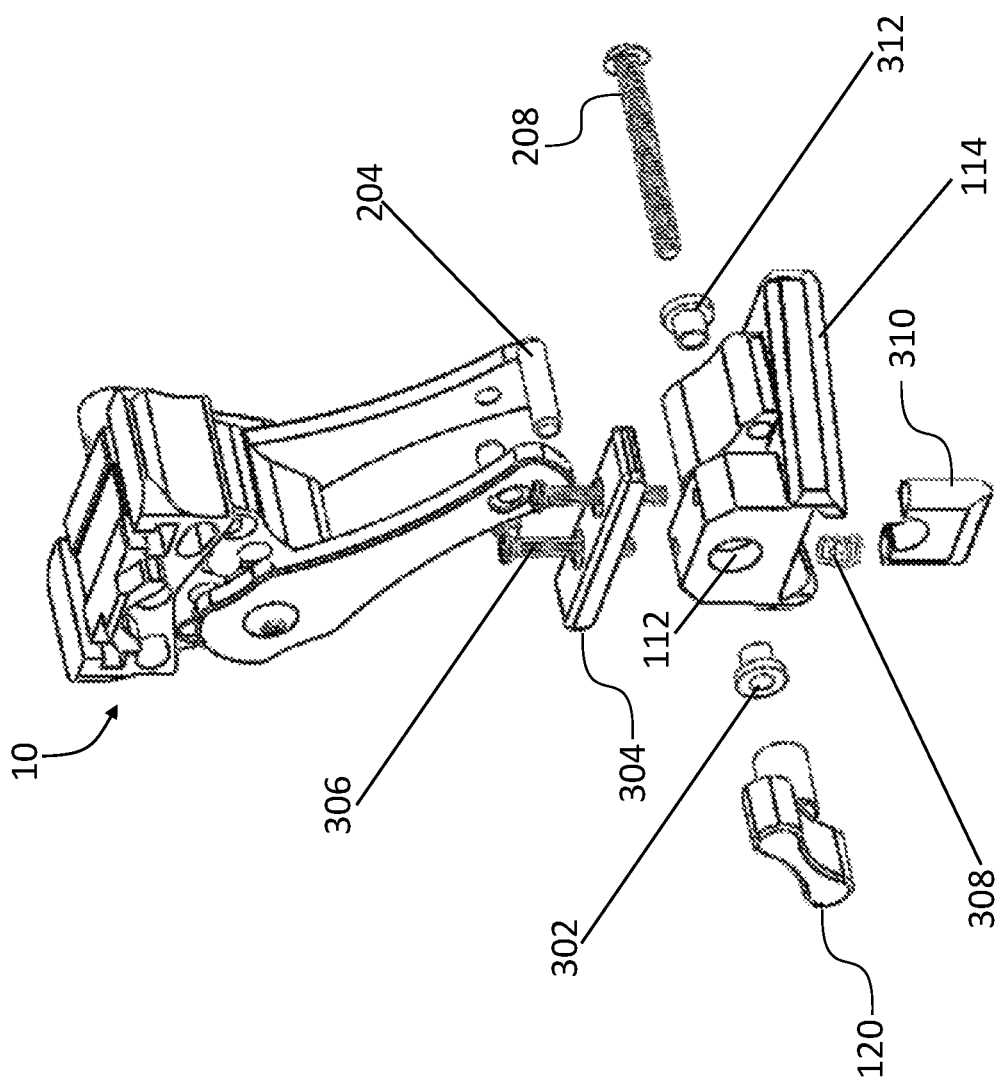
FIG. 3 is a partially exploded view of a night vision goggle adapter according to one embodiment of the present disclosure.

FIG. 3 is a partially exploded view of a night vision goggle adapter 10 according to one embodiment of the present disclosure. Depicted along the second axis 112 are the IPA torque adjustment knob 120, a first thrust washer 302 and a second thrust washer 312, and the threaded member 208. Also depicted is a locking mechanism for retaining a night vision goggle device to the goggle mount assembly 114. Here a locking plate 310 having a wedge shape is spring loaded, by spring 308, and intended to fit within a securing notch (not shown) on a night vision goggle device (also not shown). In some embodiments, more than one spring 308 may be used. The spring 308 is coupled to screws 306 that attach the lock actuator 304. Lifting the lock actuator 304 relieves the spring load on the locking plate 310 and allows for it to slide upwards and out of the securing notch which releases the night vision goggle device. In some embodiments, the locking plate 310 may feature an asymmetrical shape having a first angle of approximately 45 degrees and a second angle of approximately 15 degrees. Variation of these angles within 10-20 degrees is within the scope of the present disclosure, and such variation in design will be appreciated by one skilled in the art based on design need.

Figure 4A:
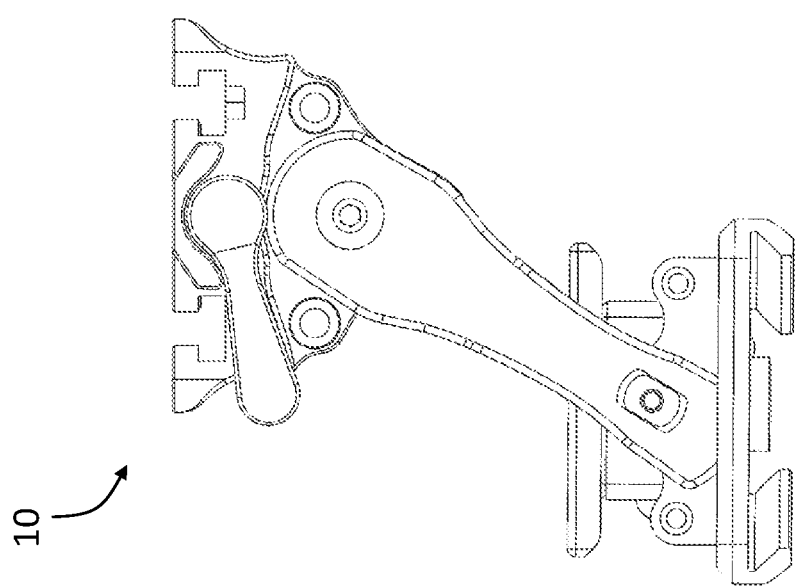
FIG. 4A is a frontal view of a night vision goggle adapter in a right eye use position according to one embodiment of the present disclosure.
Figure 4B:
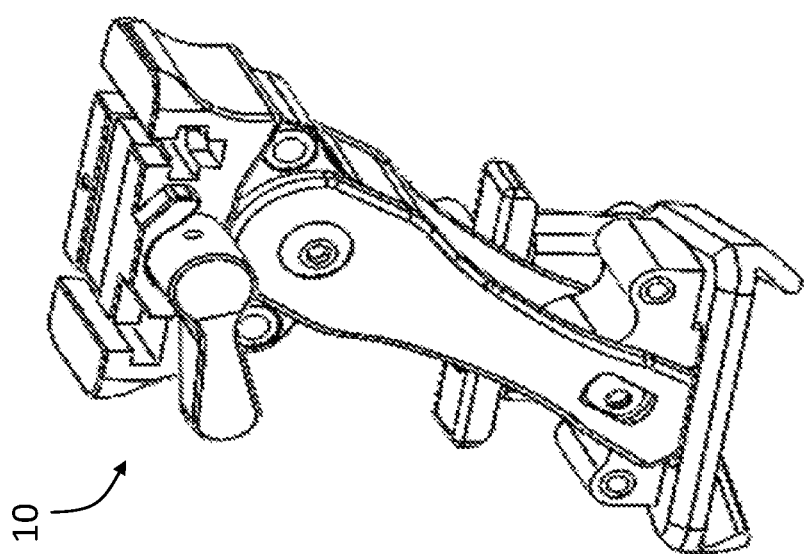
FIG. 4B is a perspective view from a forward angle of a night vision goggle adapter in a right eye use position according to one embodiment of the present disclosure.

Further depiction of the night vision goggle adapter 10 can be seen in FIGS. 4A-C that depict assembled night vision goggle adapter 10 embodiments from various perspectives.

FIG. 4A is a frontal view of a night vision goggle adapter 10 in a right eye use position according to one embodiment of the present disclosure.

FIG. 4B is a perspective view from a forward angle of a night vision goggle adapter 10 in a right eye use position according to one embodiment of the present disclosure.

FIG. 4C is a prospective view from a rearward angle of a night vision goggle adapter 10 in a right eye use position according to one embodiment of the present disclosure.

FIG. 5 is an exploded view of a night vision goggle adapter 10 (not shown) according to one embodiment of the present disclosure. Depicted herein is a partially exploded view of a dovetail adapter plate 502 and spring-loaded POGO assembly 504. The dovetail adapter plate 502 may include a spring-loaded POGO assembly 504 for providing an electrical connection with the contacts featured on some night vision goggle devices, such as a PVS 14 night vision goggle. The spring-loaded contact between the contacts of the night vision goggle and the spring-loaded POGO assembly 504 may allow for a secure contact between the spring-loaded POGO assembly 504 and the electrical contacts of the night vision goggle in various orientations and conditions while the night vision goggle is coupled to the goggle mount assembly 114. In some embodiments, a seal 503 may also be provided around the POGO assembly 504 to ensure that the integrity of the electrical contact with the night vision goggle is not compromised by external conditions such as water or humidity. In some embodiments, the dovetail adapter plate 502 may house a magnet sensor, such as a reed switch (described below in regards to FIG. 6). The dovetail adapter plate 502 may, in some embodiments, be secured by one or more securing screws 516.

FIG. 6 is a simplified depiction of a magnetic switch circuit according to one embodiment of the present disclosure. As shown, a magnet 100 is positioned between the component arms of the magnetic flux conducting unit 104. The magnetic flux conducting unit 104 conducts magnetic flux from the magnet 100 to the magnet sensor 602 that is housed within the dovetail adapter 502. The magnet sensor 602 is communicably linked with the spring-loaded POGO assembly 504 that interfaces with the electrical contacts 604 of the night vision goggle. The magnet sensor 602, depicted herein as a reed switch, is in a closed configuration, which would allow current to flow between the electrical contacts 604 of the night vision goggle and activate it. As will be appreciated by one skilled in the art, in some embodiments, this operation may be reversed regarding the opening/closing of the reed switch (switch actuation) based on the amount of magnetic flux present at the magnet sensor 602, i.e., configurations where the increased amount of magnetic flux causes the magnet sensor 602 to take an open configuration are within the scope of the present disclosure. Likewise, a night vision goggle device may have its actuation varied by either the opening or closing of a circuit containing the magnet sensor 602, and the componentry described herein may be adjusted, and in some embodiments reversed, to accommodate for such devices.

Figure 7B:
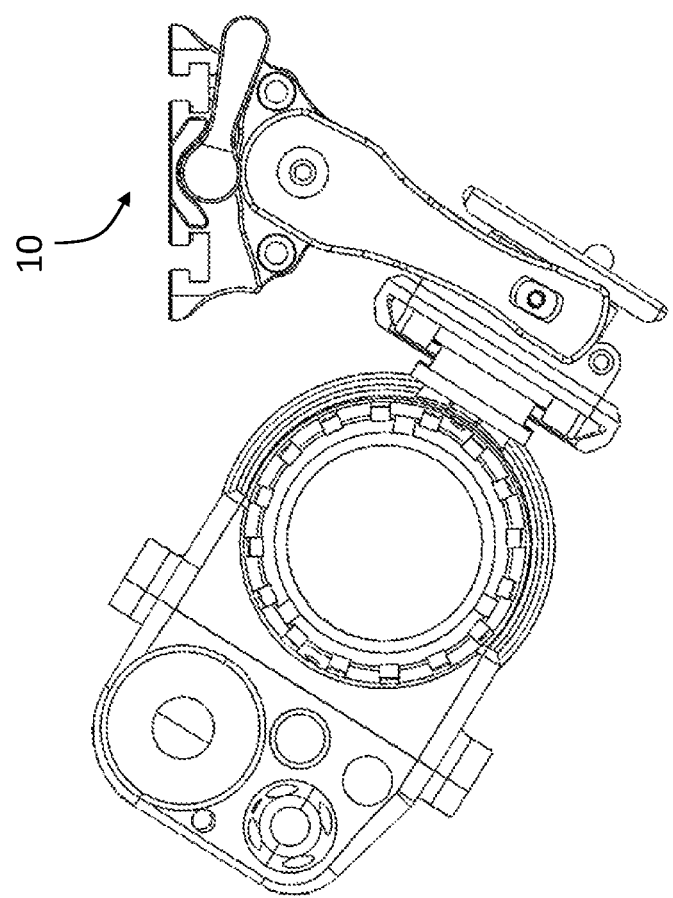
FIG. 7B is a frontal view of a night vision goggle adapter coupled to a night vision goggle in a right eye primary stow position according to one embodiment of the present disclosure.

The position of an attached night vision goggle in the "use" and various "stow" positions can be better understood by reference to FIGS. 7A-C.

FIG. 7A is a frontal view of a night vision goggle adapter coupled to a night vision goggle in a right eye use position according to one embodiment of the present disclosure. Of course, a reversed position, i.e., a position corresponding to use with a left eye of a user may also be possible with some embodiments of the present disclosure.

FIG. 7B is a frontal view of a night vision goggle adapter coupled to a night vision goggle in a right eye primary stow position according to one embodiment of the present disclosure. Of course, a reversed position, i.e., a position corresponding to primary stowage relative to a left eye of a user may also be possible with some embodiments of the present disclosure.

FIG. 7C is a frontal view of a night vision goggle adapter coupled to a night vision goggle in a right eye secondary stow position according to one embodiment of the present disclosure. Of course, a reversed position, i.e., a position corresponding to secondary stowage relative to a left eye of a user may also be possible with some embodiments of the present disclosure.

Figure 8A:
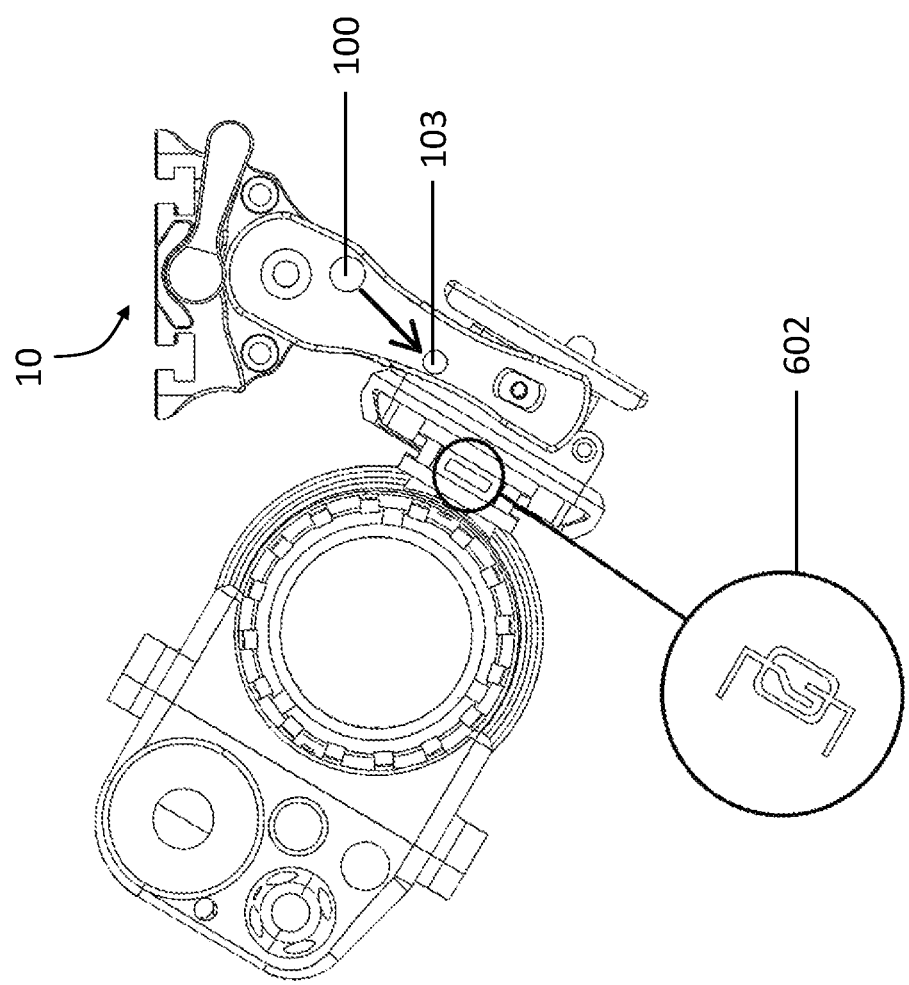
FIG. 8A is a frontal view of a night vision goggle adapter coupled to a night vision goggle in a right eye primary stow position including arrows depicting the direction of magnetic flux flow and a representation of the approximate location and state of the magnetic switch in a right eye primary stow position according to one embodiment of the present disclosure.
Figure 8B:
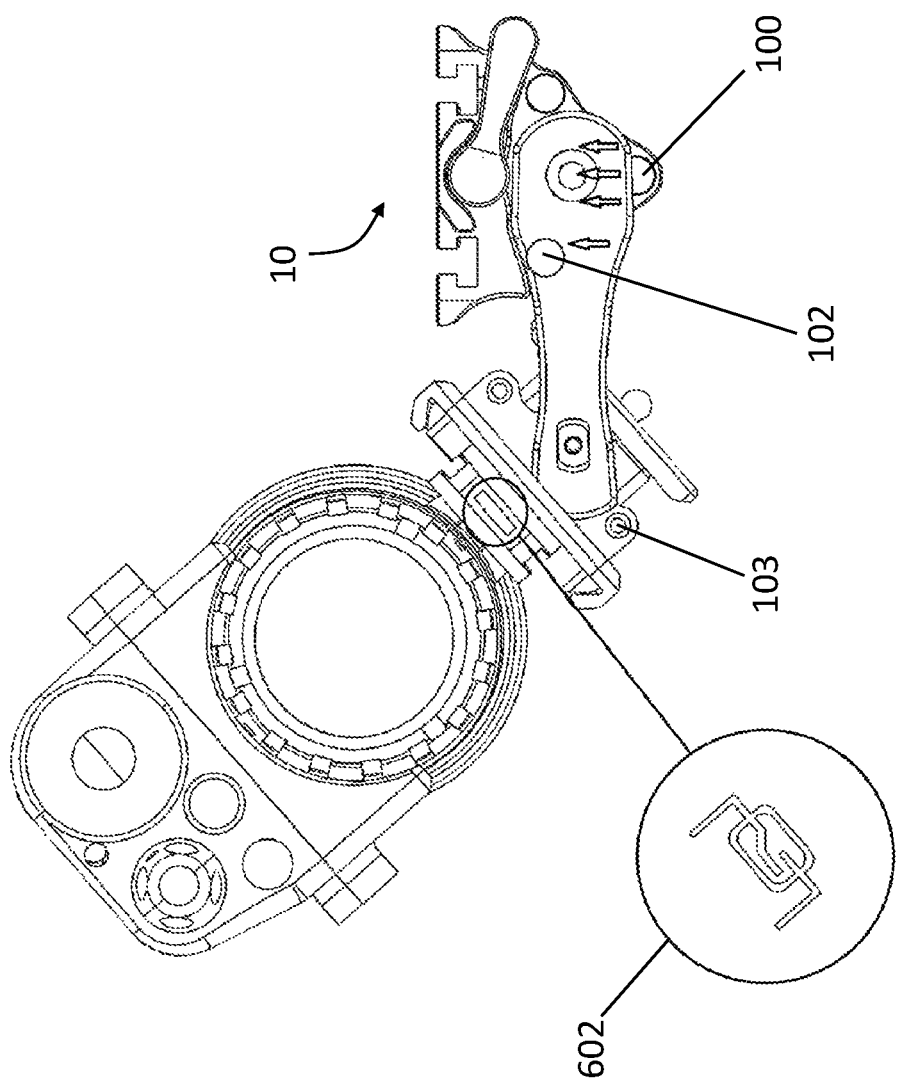
FIG. 8B is a frontal view of a night vision goggle adapter coupled to a night vision goggle in a right eye secondary stow position including arrows depicting the direction of magnetic flux flow and a representation of the approximate location and state of the magnetic switch in a right eye secondary stow position according to one embodiment of the present disclosure.

The flow of the magnetic flux through the magnetic circuit when the night vision goggle adapter 10 is configured in a "stow" position can be better understood by reference to FIGS. 8A-C.

FIG. 8A is a frontal view of a night vision goggle adapter 10 coupled to a night vision goggle in a right eye primary stow position including arrows depicting the direction of magnetic flux flow and a representation of the approximate location and state of the magnetic switch 602 in a right eye primary stow position according to one embodiment of the present disclosure. As will be understood by those skilled in the art, the magnetic flux from the magnet 100 is not entirely conducted within the magnetic circuit. As such, the arrows represent a generalization of the flow of magnetic flux from the magnet 100 to one of the second plurality of flux shunts 103 that are overlapped by the magnetic flux conducting unit 104 while the night vision goggle adapter 10 is in a "stow" position. Additionally, the representation of the magnet sensor 602 is shown to indicate that, in an embodiment where the magnet sensor 602 is a reed switch, the attached night vision goggle will be inactivated due to the "short" in the magnetic flux being conducted to the magnet sensor 602 via one of the second plurality of flux shunts 103.

FIG. 8B is a frontal view of a night vision goggle adapter 10 coupled to a night vision goggle in a right eye secondary stow position including arrows depicting the direction of magnetic flux flow and a representation of the approximate location and state of the magnetic switch 602 in a right eye secondary stow position according to one embodiment of the present disclosure. As will be understood by those skilled in the art, the magnetic flux from the magnet 100 is not entirely conducted within the magnetic circuit. As such, the arrows represent a generalization of the flow of magnetic flux from the magnet 100 to one of the first plurality of flux shunts 102 that are overlapped by the magnetic flux conducting unit 104 while the night vision goggle adapter 10 is in a "stow" position. Additionally, the representation of the magnet sensor 602 is shown to indicate that, in an embodiment where the magnet sensor 602 is a reed switch, the attached night vision goggle will be inactivated due to the "short" in the magnetic flux being conducted to the magnet sensor 602 via one of the first plurality of flux shunts 102.

FIG. 8C is a frontal view of a night vision goggle adapter 10 coupled to a night vision goggle in a right eye tertiary stow position including arrows depicting the direction of magnetic flux flow and a representation of the approximate location and state of the magnetic switch 602 in a right eye tertiary stow position according to one embodiment of the present disclosure. As will be understood by those skilled in the art, the magnetic flux from the magnet 100 is not entirely conducted within the magnetic circuit. As such, the arrows represent a generalization of the flow of magnetic flux from the magnet 100 to one of the first plurality of flux shunts 102 and one of the second plurality of flux shunts 103 that are overlapped by the magnetic flux conducting unit 104 while the night vision goggle adapter 10 is in a "stow" position. Additionally, the representation of the magnet sensor 602 is shown to indicate that, in an embodiment where the magnet sensor 602 is a reed switch, the attached night vision goggle will be inactivated due to the "short" in the magnetic flux being conducted to the magnet sensor 602 via one of the first plurality of flux shunts 102 and one of the second plurality of flux shunts 103.

Figure 9A:
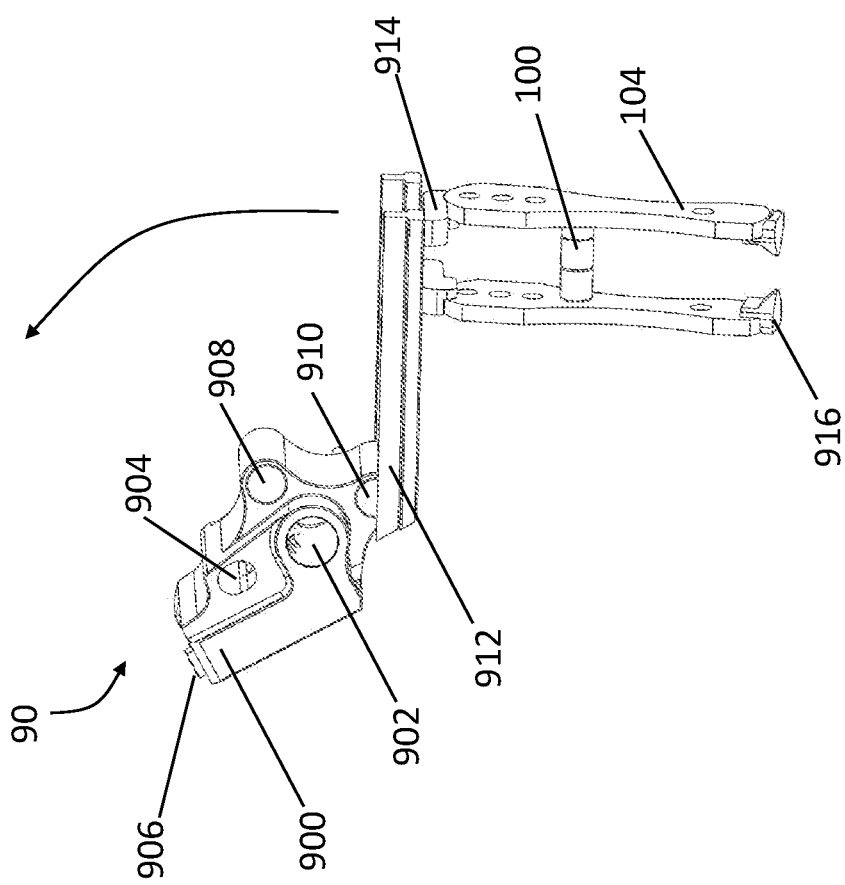
FIG. 9A is a perspective view of a flux switching helmet mount assembly, omitting some components for clarity, according to one embodiment of the present disclosure.

FIG. 9A is a perspective view of a flux switching helmet mount assembly 90, omitting some components for clarity, according to one embodiment of the present disclosure. Here a mounting base 900 is depicted containing a rail pivot point or central axis 902, a booster magnet 910, and a suppressor magnet 908 for use in a flux switching helmet mount assembly 90 according to one embodiment of the present disclosure. Also depicted are magnetic flux conducting fore/aft rails included in a magnetic flux conducting rail assembly 912. The magnetic flux conducting rail assembly 912 is rotatably coupled to the central axis 902 of the mounting base 900, although the structure connecting these components is omitted in the figure for clarity. A night vision goggle adapter 10, as described above, may be mounted to the magnetic flux conducting rail assembly 912. Not all components of the night vision goggle adapter 10 are illustrated in the figure for clarity, however the magnet 100 (shown as connected smaller magnets) and the magnetic flux conducting unit 104 are depicted. Sliding flux transfer blocks 914 connect the magnetic flux conducting unit 104 to the magnetic flux conducting rail assembly 912 in some embodiments such that magnetic flux may be conducted from the booster magnet 910 and suppressor magnet 908 of the mounting base 900 into the magnetic circuit of the night vision goggle adapter 10. Flux concentrators 916 are also depicted as connected to the magnetic flux conducting units 104. The flux concentrators 916 may serve, in some embodiments, to focus the magnetic flux being conducted through the magnetic circuit in the vicinity of the magnet sensor 602 (not shown).

The flux switching helmet mount assembly 90 may, in some embodiments, allow for additional switching modes for the night vision goggle adapter 10 by using the booster magnet 910 and suppressor magnet 908 to redirect magnetic flux within the magnetic circuit of the night vision goggle adapter 10. Redirection of magnetic flux within the magnetic circuit may be achieved by directing flux from either the booster magnet 910 or the suppressor magnet 908 into the magnetic circuit via the magnetic flux conducting rail assembly 912 and the sliding flux transfer blocks 914. As will be appreciated by one skilled in the art, the conduction of magnetic flux is varied according to the configuration of the flux switching helmet mount assembly 90 and, as such, the same materials described for construction of the night vision goggle adapter 10 may, in some embodiments, be used for the flux switching helmet mount assembly 90 componentry. Likewise, those materials and magnetic field strengths described previously for the primary magnet 100 are applicable to both the composition of, and strengths, of the booster magnet 910 and the suppressor magnet 908. In some embodiments, strengths of the booster magnet 910 and the suppressor magnet 908 may be greater than that of the primary magnet 100. As will be appreciated by one skilled in the art, any suitable strengths for the booster magnet 910 and the suppressor magnet 908 may be used within the scope of the present disclosure.

The booster magnet 910 may be oriented such that its polar alignment is shared by that of the magnet 100. This shared polar alignment may, in some embodiments, cause magnetic flux from the North pole of the magnet 100 to be repelled by the magnetic flux from the North pole of the booster magnet 910 and directed along the magnetic flux conducting units 104 towards the magnet sensor 602 (not shown). This may, in some embodiments, increase the amount of magnetic flux conducted to the magnet sensor 602 (not shown) and cause the sensor to actuate and turn an attached night vision goggle on. As will be appreciated by one skilled in the art, the variation in the magnetic flux conducted from the magnet 100 when the flux switching helmet mount assembly 90 when in an "on" position can be manipulated by variation in the materials, magnetic strength of the magnet 100, or the sensitivity of the magnet sensor 602 (not shown) to achieve the desired operation of an attached night vision goggle (not shown). The flow of magnetic flux in the "on" position may be further understood by reference to FIG. 10.

In an "off" position, wherein the magnetic flux conducting rail assembly 912 is rotated such that the suppressor magnet 908 is in close proximity to, or overlapped by, the magnetic flux conducting rail assembly 912, the suppressor magnet 908 is in opposing polar alignment with the magnet 100. This opposing polar alignment may, in some embodiments, cause magnetic flux from the North pole of the magnet 100 to be attracted to the magnetic flux from the South pole of the suppressor magnet 908 such that the amount of flux directed to the magnet sensor 602 (not shown) is reduced causing it to be in an open configuration which in turn powers off an attached night vision goggle (not shown). As will be appreciated by one skilled in the art, the variation in the magnetic flux conducted from the magnet 100 when the flux switching helmet mount assembly 90 when in an "off" position can be manipulated by variation in the materials, magnetic strength of the magnet 100, or the sensitivity of the magnet sensor 602 (not shown) to achieve the desired operation of an attached night vision goggle (not shown). The flow of magnetic flux in the "off" position may be further understood by reference to FIG. 11.

The mounting base 900 of the flux switching helmet mount assembly 90 may also include a locking mechanism that may couple to the mounting base 900 at a through-hole 904. Any type of locking mechanism that can retain the magnetic flux conducting rail assembly 912 in the "on" and "off" positions and be released by a user to facilitate switching between the "on" and "off" positions may be used. In some embodiments, a friction lock may be used that can be released by depressing a corresponding button (not shown).

Also depicted is a helmet mounting point 906 coupled to the mounting base 900. Any suitable structure intended to detachably couple to a corresponding mount on a helmet (not shown), such as a dovetail mount or T-rail, may be used within the scope of the present disclosure.

Figure 9B:
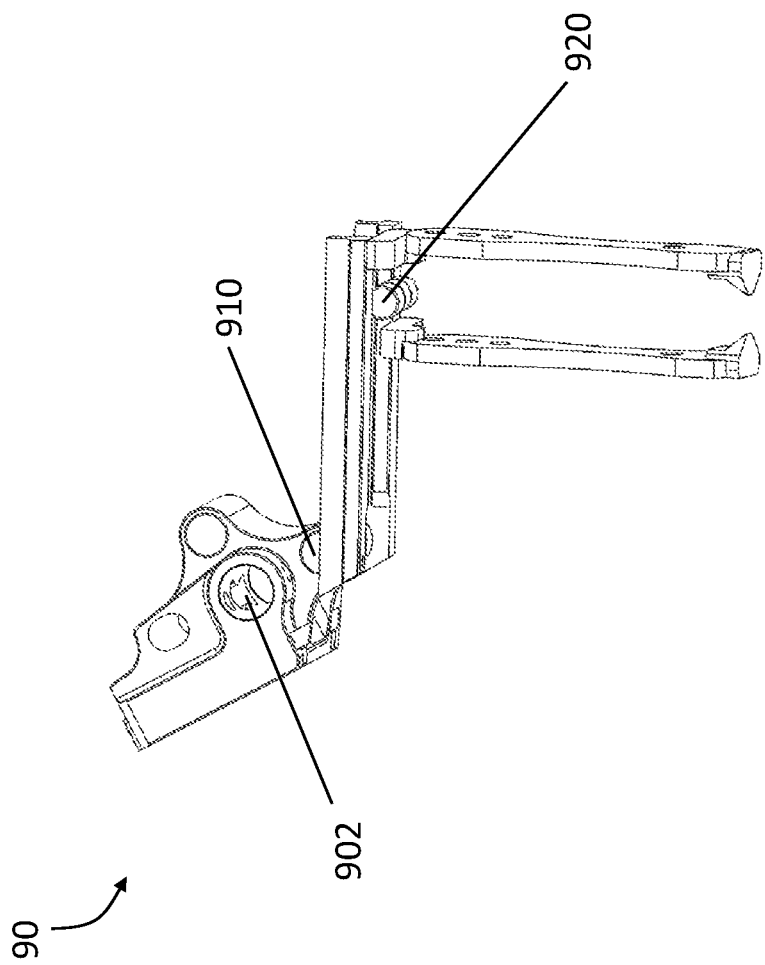
FIG. 9B is a perspective view of a flux switching helmet mount assembly, omitting some components for clarity, according to one embodiment of the present disclosure.

FIG. 9B is a perspective view of a flux switching helmet mount assembly 90, omitting some components for clarity, according to one embodiment of the present disclosure. This depiction includes an addition tertiary magnet 920 located adjacent to the magnetic flux conducting rail assembly 912. The tertiary magnet 920 may be used in conjunction with the other magnetic components described above to fine-tune the amount of magnetic flux being conducted to the magnetic circuit of an attached night vision goggle adapter 10.

FIG. 10 is a simplified diagram of a magnetic flux circuit of a night vision goggle adaptor 10 in use with a flux switching helmet mount assembly 90 representing the magnetic flux reaching a magnetic sensor 602 (shown as a reed switch) in a "on" position, according to one embodiment of the present disclosure. The polar orientation of the booster magnet 910 is depicted in alignment with the polar orientation of the magnet 100 (alternatively referred to as the primary magnet 100). As shown, the North poles of both the booster magnet 910 and the magnet 100 are repelling one another. This repulsion directs an increased amount of magnetic flux from the magnet 100 towards the magnet sensor 602 (shown as a reed switch) via the magnetic flux conducting rail assembly 912 and the magnetic flux conducting unit 104 which causes the switch to be closed. In this embodiment, the switch being closed causes an attached night vision goggle to power on.

FIG. 11 is a simplified diagram of a magnetic flux circuit of a night vision goggle adaptor 10 in use with a flux switching helmet mount assembly 90 representing the magnetic flux reaching a magnetic sensor 602 (shown as a reed switch) in an "off" position, according to one embodiment of the present disclosure. The polar orientation of the suppressor magnet 908 is depicted in opposition with the polar orientation of the magnet 100 (alternatively referred to as the primary magnet 100). As shown, the South pole of the suppressor magnet 908 and the North pole of the magnet 100 are attracting one another. This attraction directs a decreased amount of magnetic flux from the magnet 100 towards the magnet sensor 602 (shown as a reed switch) via the magnetic flux conducting rail assembly 912 and the magnetic flux conducting unit 104 which causes the switch to be open. In this embodiment, the switch being open causes an attached night vision goggle to power off.

The use of the flux switching helmet mount assembly 90 may, in some embodiments, provide an additional rotational axis about which an attached night vision goggle may be positioned while also providing an additional switching mode for the night vision goggle adapter 10. This may, in some embodiments, be advantageous in providing additional stow positions for an attached night vision goggle where the device is turned off while in a stowed position. The use of the flux switching helmet mount assembly 90 may, in some embodiments, be used in concert with the switching modes provided by the use of first plurality of flux shunts 102 and/or the second plurality of flux shunts 103 within the magnetic circuit of the night vision goggle adapter 10. However, as will be understood by one skilled in the art, the use of either the flux switching components or the flux shunts may be utilized in various embodiments individually or in combination to provide for flexibility of design and switching modes. Additionally, the use of the flux switching helmet mount assembly 90 may be advantageous, in some embodiments, by causing a redirection of magnetic flux through the magnetic circuit which helps to counteract residual magnetic fields developed within the components of the night vision goggle adapter 10 resulting from the presence of the magnetic field of the magnet 100 and the magnetic retentivity inherent in said components.

The modes of operation for the flux switching helmet mount assembly 90 when used in combination with the night vision goggle adapter 10 can be further understood with reference to FIGS. 12A-15B. Descriptions of which are provided below.

Figure 12A:
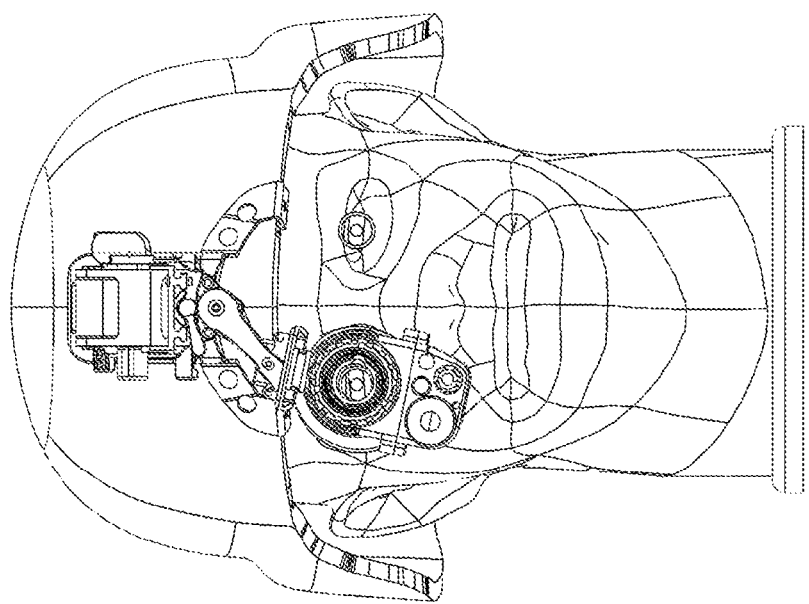
FIG. 12A is a frontal view of a flux switching helmet mount assembly coupled to a night vision goggle adapter, as worn by a user, in a right eye use position according to one embodiment of the present disclosure.

FIG. 12A is a frontal view of a flux switching helmet mount assembly 90 coupled to a night vision goggle adapter 10, as worn by a user, in a right eye use position according to one embodiment of the present disclosure. In this configuration, the night vision goggle is positioned for use in front of the user's right eye. As will be appreciated by those skilled in the art, the embodiment as depicted may also be configured to position the night vision goggle in front of the user's left eye. As depicted, the night vision goggle adapter 10 is configured in a use position, i.e., none of the first plurality of shunts 102 and none of the second plurality of shunts 103 are overlapped by the magnetic flux conducting unit 104. Additionally, the flux switching helmet mount 90 is in the active, or "on," position causing an increased amount of magnetic flux to be directed toward the magnetic sensor 602 of the night vision goggle. Thus, the magnetic sensor 602 will be closed and the night vision goggle will be activated.

Figure 12B:
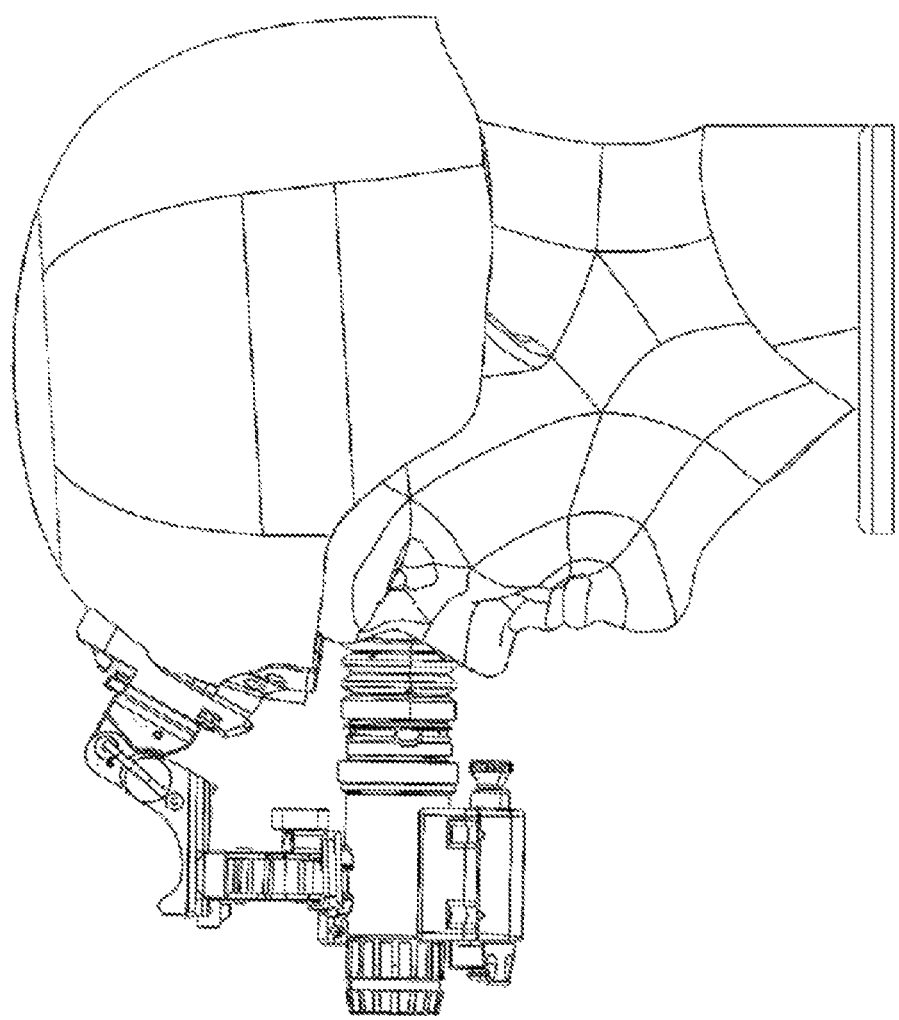
FIG. 12B is a lateral view of a flux switching helmet mount assembly coupled to a night vision goggle adapter, as worn by a user, in a right eye use position according to one embodiment of the present disclosure.

FIG. 12B is a lateral view of a flux switching helmet mount assembly 90 coupled to a night vision goggle adapter 10, as worn by a user, in a right eye use position according to one embodiment of the present disclosure. In this configuration, the night vision goggle is positioned for use in front of the user's right eye. As will be appreciated by those skilled in the art, the embodiment as depicted may also be configured to position the night vision goggle in front of the user's left eye. As depicted, the night vision goggle adapter 10 is configured in a use position, i.e., none of the first plurality of flux shunts 102 and none of the second plurality of flux shunts 103 are overlapped by the magnetic flux conducting unit 104. Additionally, the flux switching helmet mount 90 is in the active, or "on," position causing an increased amount of magnetic flux to be directed toward the magnetic sensor 602 of the night vision goggle. Thus, the magnetic sensor 602 will be closed and the night vision goggle will be activated.

Figure 13A:
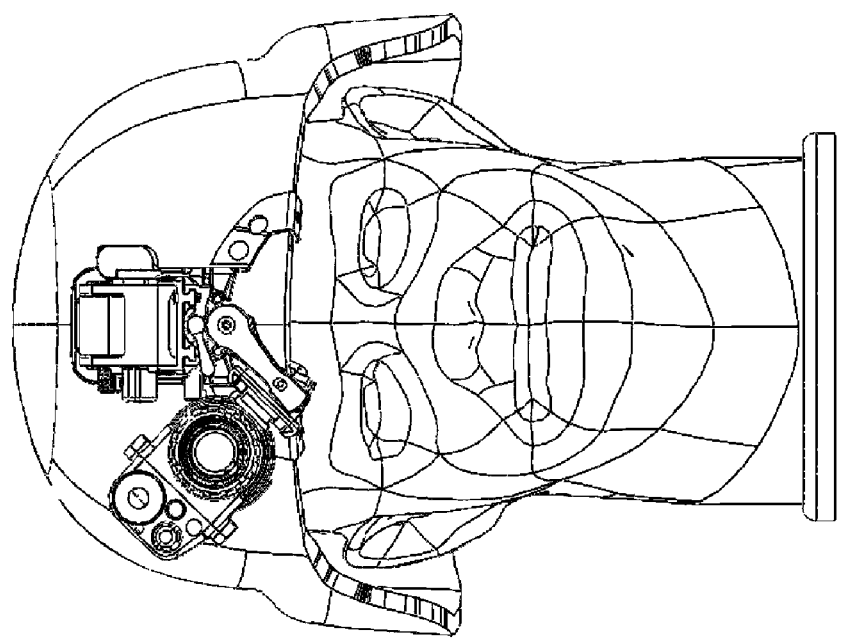
FIG. 13A is a frontal view of a flux switching helmet mount assembly coupled to a night vision goggle adapter, as worn by a user, in a right eye primary stow position according to one embodiment of the present disclosure.

FIG. 13A is a frontal view of a flux switching helmet mount assembly 90 coupled to a night vision goggle adapter 10, as worn by a user, in a right eye primary stow position according to one embodiment of the present disclosure. In this configuration, the night vision goggle is positioned for convenient storage away from the user's right eye. As will be appreciated by those skilled in the art, the embodiment as depicted may also be configured to position the night vision goggle for convenient storage adjacent to the user's left eye. As depicted, the night vision goggle adapter 10 is configured in a primary stow position, i.e., none of the first plurality of flux shunts 102 are overlapped by the magnetic flux conducting unit 104 and one of the second plurality of flux shunts 103 is overlapped by the magnetic flux conducting unit 104. The flux switching helmet mount 90 is in the active, or "on," position causing an increased amount of magnetic flux to be directed toward the magnetic sensor 602 of the night vision goggle, but the magnetic flux is shorted through the overlapped one of the second plurality of flux shunts 103 preventing a sufficient amount of magnetic flux from reaching the magnetic sensor 602. Thus, the magnetic sensor 602 will be open and the night vision goggle will be deactivated.

Figure 13B:
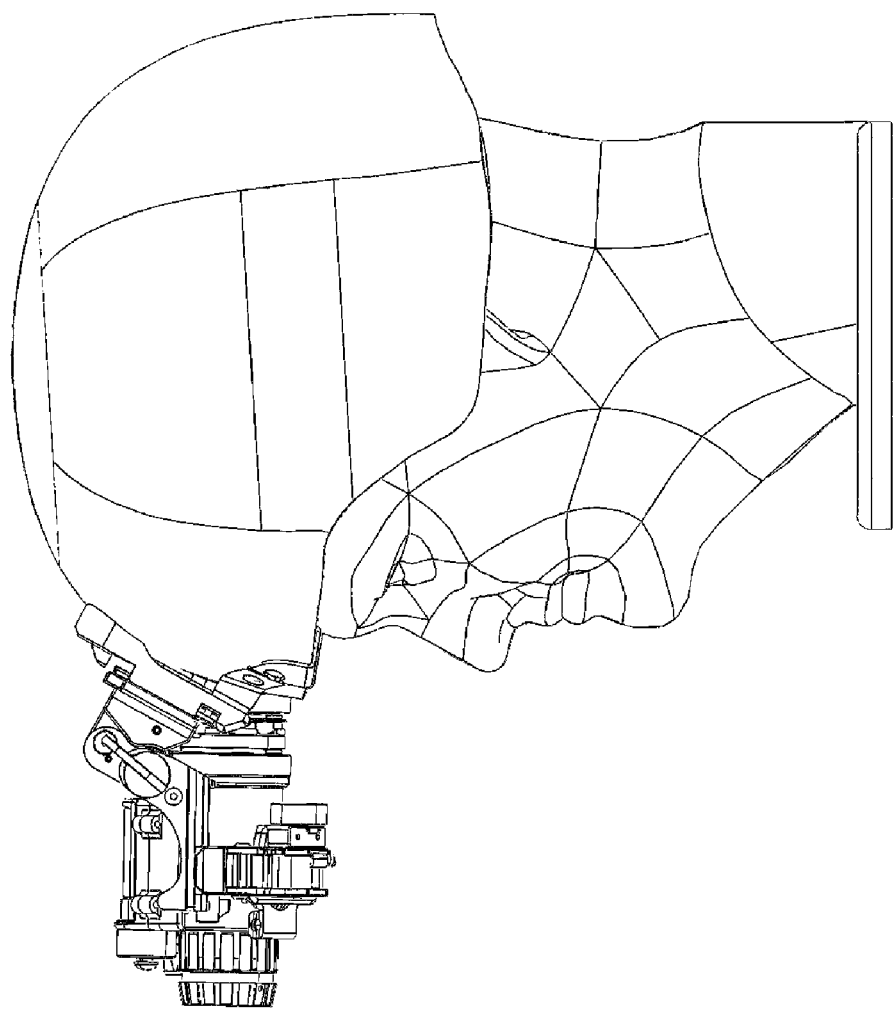
FIG. 13B is a lateral view of a flux switching helmet mount assembly coupled to a night vision goggle adapter, as worn by a user, in a right eye primary stow position according to one embodiment of the present disclosure.

FIG. 13B is a lateral view of a flux switching helmet mount assembly 90 coupled to a night vision goggle adapter 10, as worn by a user, in a right eye primary stow position according to one embodiment of the present disclosure. In this configuration, the night vision goggle is positioned for convenient storage away from the user's right eye. As will be appreciated by those skilled in the art, the embodiment as depicted may also be configured to position the night vision goggle for convenient storage adjacent to the user's left eye. As depicted, the night vision goggle adapter 10 is configured in a primary stow position, i.e., none of the first plurality of flux shunts 102 are overlapped by the magnetic flux conducting unit 104 and one of the second plurality of flux shunts 103 is overlapped by the magnetic flux conducting unit 104. The flux switching helmet mount 90 is in the active, or "on," position causing an increased amount of magnetic flux to be directed toward the magnetic sensor 602 of the night vision goggle, but the magnetic flux is shorted through the overlapped one of the second plurality of shunts 103 preventing a sufficient amount of magnetic flux from reaching the magnetic sensor 602. Thus, the magnetic sensor 602 will be open and the night vision goggle will be deactivated.

Figure 14A:
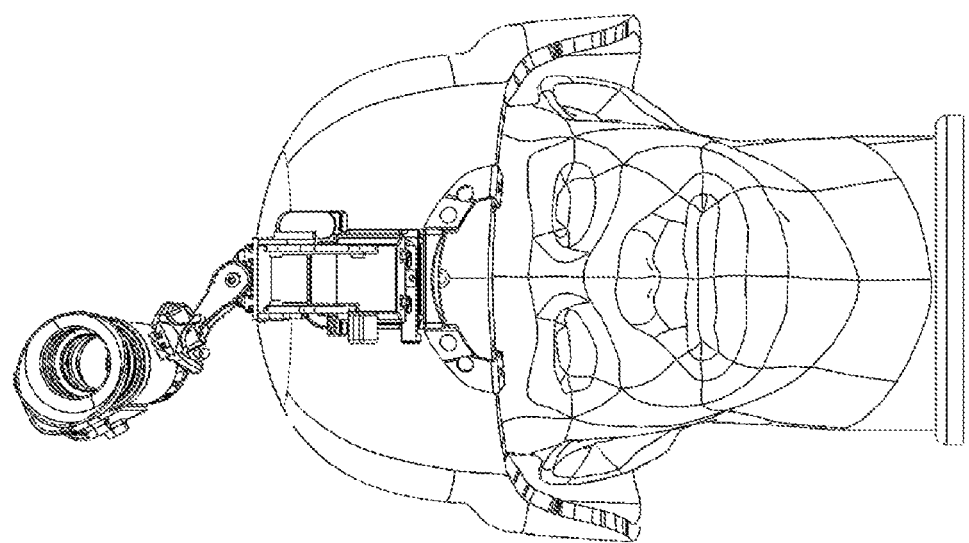
FIG. 14A is a frontal view of a flux switching helmet mount assembly coupled to a night vision goggle adapter, as worn by a user, in a right eye flipped stow position according to one embodiment of the present disclosure.

FIG. 14A is a frontal view of a flux switching helmet mount assembly 90 coupled to a night vision goggle adapter 10, as worn by a user, in a right eye primary flipped stow position according to one embodiment of the present disclosure. In this configuration, the night vision goggle is positioned for convenient storage above the user's right eye. As will be appreciated by those skilled in the art, the embodiment as depicted may also be configured to position the night vision goggle for convenient storage above the user's left eye. As depicted, the night vision goggle adapter 10 is configured in a use position, i.e., none of the first plurality of flux shunts 102 are overlapped by the magnetic flux conducting unit 104 and none of the second plurality of flux shunts 103 are overlapped by the magnetic flux conducting unit 104. The flux switching helmet mount 90 is in the flipped, or "off," position, wherein the suppressor magnet 908 is in polar alignment with the magnet 100 and attracts some of the magnetic flux ordinarily conducted through the magnetic circuit of the night vision goggle adapter 10, causing a decreased amount of magnetic flux to be directed toward the magnetic sensor 602 of the night vision goggle which prevents a sufficient amount of magnetic flux from reaching the magnetic sensor 602. Thus, the magnetic sensor 602 will be open and the night vision goggle will be deactivated.

Figure 14B:
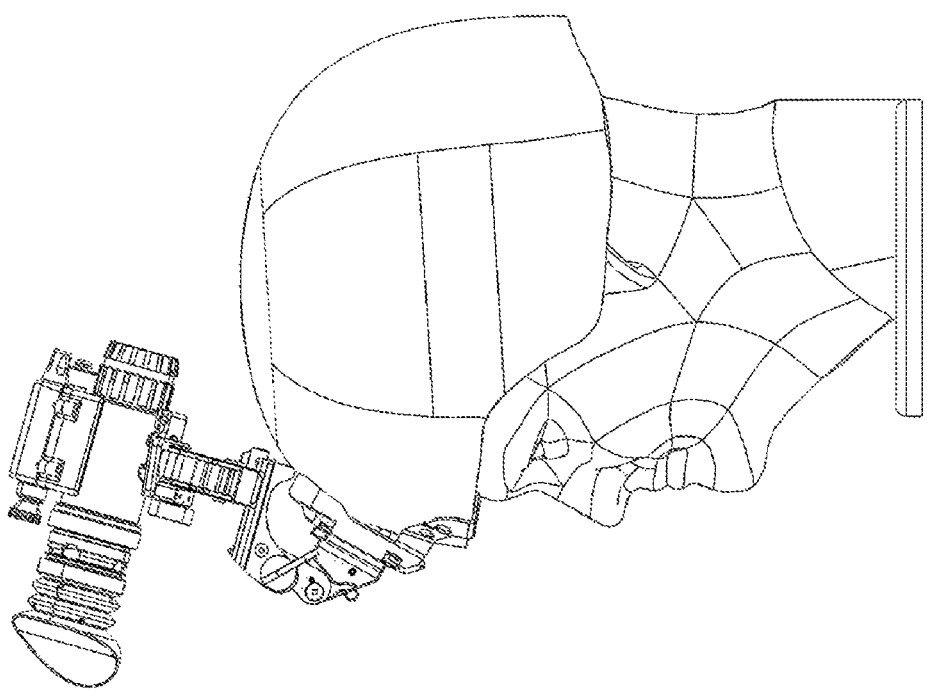
FIG. 14B is a lateral view of a flux switching helmet mount assembly coupled to a night vision goggle adapter, as worn by a user, in a right eye primary flipped stow position according to one embodiment of the present disclosure.

FIG. 14B is a lateral view of a flux switching helmet mount assembly 90 coupled to a night vision goggle adapter 10, as worn by a user, in a right eye primary flipped stow position according to one embodiment of the present disclosure. In this configuration, the night vision goggle is positioned for convenient storage above the user's right eye. As will be appreciated by those skilled in the art, the embodiment as depicted may also be configured to position the night vision goggle for convenient storage above the user's left eye. As depicted, the night vision goggle adapter 10 is configured in a use position, i.e., none of the first plurality of flux shunts 102 are overlapped by the magnetic flux conducting unit 104 and none of the second plurality of flux shunts 103 are overlapped by the magnetic flux conducting unit 104. The flux switching helmet mount 90 is in the flipped, or "off," position, wherein the suppressor magnet 908 is in polar alignment with the magnet 100 and attracts some of the magnetic flux ordinarily conducted through the magnetic circuit of the night vision goggle adapter 10, causing a decreased amount of magnetic flux to be directed toward the magnetic sensor 602 of the night vision goggle which prevents a sufficient amount of magnetic flux from reaching the magnetic sensor 602. Thus, the magnetic sensor 602 will be open and the night vision goggle will be deactivated.

Figure 15A:
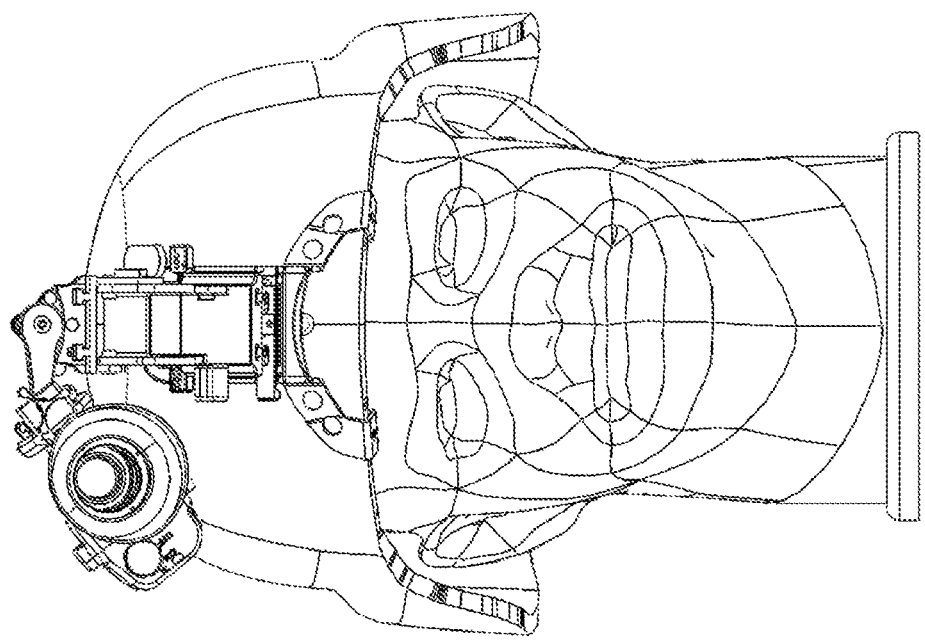
FIG. 15A is a frontal view of a flux switching helmet mount assembly coupled to a night vision goggle adapter, as worn by a user, in a right eye secondary flipped stow position according to one embodiment of the present disclosure.

FIG. 15A is a frontal view of a flux switching helmet mount assembly 90 coupled to a night vision goggle adapter 10, as worn by a user, in a right eye secondary flipped stow position according to one embodiment of the present disclosure. In this configuration, the night vision goggle is positioned for convenient storage above and laterally away from the user's right eye. As will be appreciated by those skilled in the art, the embodiment as depicted may also be configured to position the night vision goggle for convenient storage above and laterally away from the user's left eye. As depicted, the night vision goggle adapter 10 is configured in a secondary stow position, i.e., one of the first plurality of flux shunts 102 is overlapped by the magnetic flux conducting unit 104 and none of the second plurality of flux shunts 102 are overlapped by the magnetic flux conducting unit 104. The flux switching helmet mount 90 is in the flipped, or "off," position causing a decreased amount of magnetic flux to be directed toward the magnetic sensor 602, as described above in regards to FIG. 14A, and magnetic flux is also shorted through the overlapped one of the first plurality of flux shunts 102, which prevents a sufficient amount of magnetic flux from reaching the magnetic sensor 602. Thus, the magnetic sensor 602 will be open and the night vision goggle will be deactivated. This configuration is advantageous in situations where a user wants to stow the night vision goggle away from his or her face but also wishes to reduce the height the night vision goggle is raised above the head. For example, while inside a vehicle, there may be reduced clearance for objects that are raised above the head, and the use of the secondary flipped stow position can allow for a user to more easily move within the vehicle.

Figure 15B:
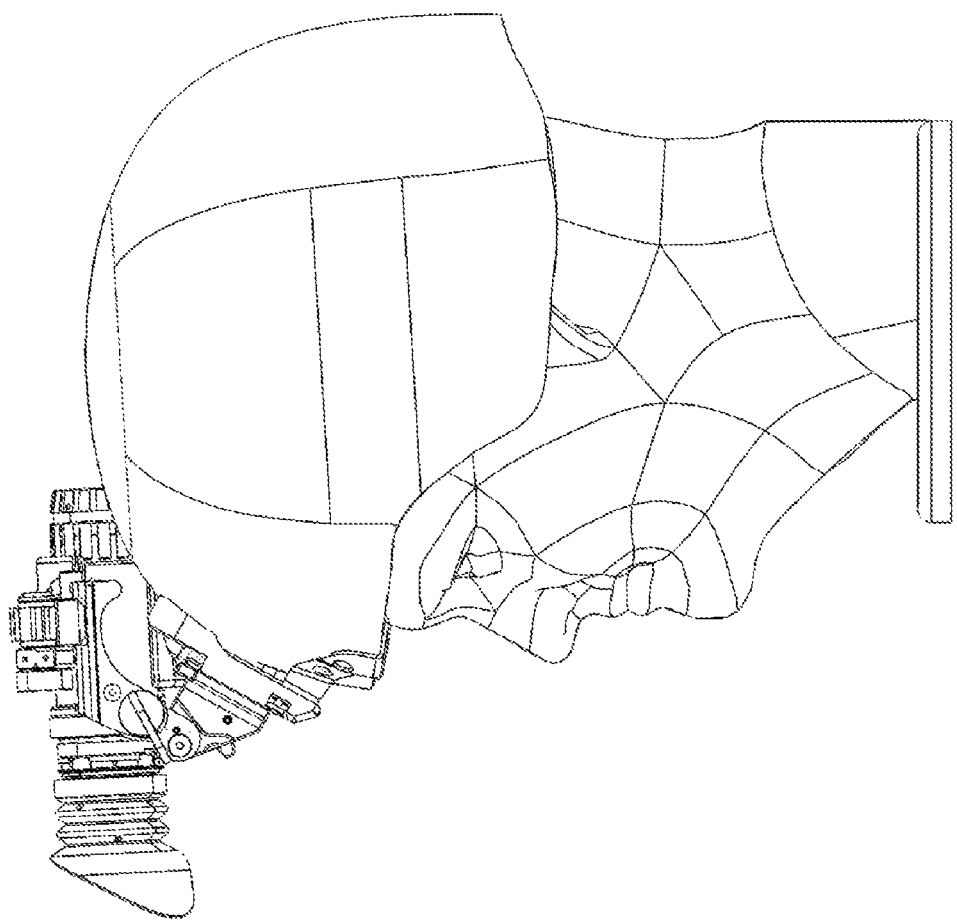
FIG. 15B is a lateral view of a flux switching helmet mount assembly coupled to a night vision goggle adapter, as worn by a user, in a right eye secondary flipped stow position according to one embodiment of the present disclosure.

FIG. 15B is a lateral view of a flux switching helmet mount assembly 90 coupled to a night vision goggle adapter 10, as worn by a user, in a right eye secondary flipped stow position according to one embodiment of the present disclosure. In this configuration, the night vision goggle is positioned for convenient storage above and laterally away from the user's right eye. As will be appreciated by those skilled in the art, the embodiment as depicted may also be configured to position the night vision goggle for convenient storage above and laterally away from the user's left eye. As depicted, the night vision goggle adapter 10 is configured in a secondary stow position, i.e., one of the first plurality of flux shunts 102 is overlapped by the magnetic flux conducting unit 104 and none of the second plurality of flux shunts 102 are overlapped by the magnetic flux conducting unit 104. The flux switching helmet mount 90 is in the flipped, or "off," position causing a decreased amount of magnetic flux, as described above in regards to FIG. 14A, to be directed toward the magnetic sensor 602, and magnetic flux is also shorted through the overlapped one of the first plurality of flux shunts 102, which prevents a sufficient amount of magnetic flux from reaching the magnetic sensor 602. Thus, the magnetic sensor 602 will be open and the night vision goggle will be deactivated. This configuration is advantageous in situations where a user wants to stow the night vision goggle away from his or her face but also wishes to reduce the height the night vision goggle is raised above the head. For example, while inside a vehicle, there may be reduced clearance for objects that are raised above the head, and the use of the secondary flipped stow position can allow for a user to more easily move within the vehicle.

Figure 16:
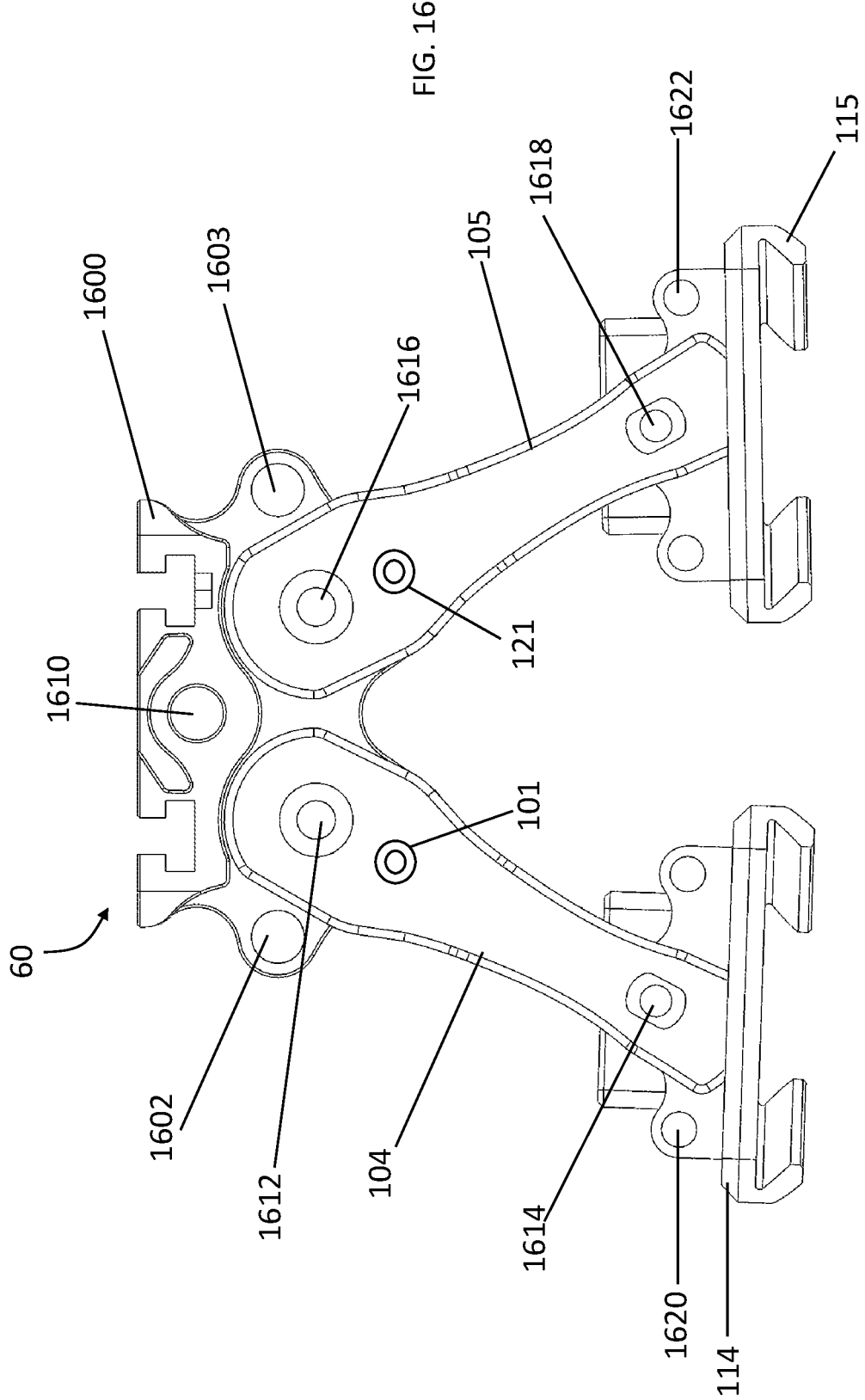
FIG. 16 is a frontal view of a dual night vision goggle adapter according to one embodiment of the present disclosure.

FIG. 16 is a frontal view of a dual night vision goggle adapter 60 according to one embodiment of the present disclosure. The dual night vision goggle adapter 60 may, in some embodiments, include a base 1600. The base 1600 may be formed of a low magnetic permeability metal or plastic such as aluminum, nylon, or a polyimide thermoplastic resin such as Ultem® or Grivory®. Ultem® is a registered trademark of General Electric. Grivory® is a registered trademark of EMS-GRIVORY. Other materials of suitable strength and magnetic permeability as would be known to one skilled in the art may be used within the scope of the present disclosure. As depicted, the base 1600 may include a mounting surface and a locking mechanism 1610 configured to retain the dual night vision goggle adapter 60 to another device or surface configured to mate with the mounting surface. The locking mechanism 1610 may, in some embodiments, include a lever arm (not depicted) that, when rotated, causes an increased amount of pressure to be applied to a surface mated to the mounting surface.

In some embodiments, a first magnet 101 may be positioned adjacent to a first axis 1612. The first magnet 101 may be composed of any of the materials described previously in regards to the night vision goggle adapter 10. A first magnetic flux conducting unit 104, similar (in form and composition) to that described above in regards to FIG. 1, may, in some embodiments, be configured to be rotatably coupled to the first axis 1612. The first axis 1612 may, in some embodiments, be positioned such that the first magnetic flux conducting unit 104 overlaps the first magnet 101 at a range of angular displacements (as depicted) but would not overlap the first magnet when the angular displacement falls outside of this range. These embodiments may allow for a wearer/user to vary the amount of flux being conducted to a magnet sensor 602 (not shown), such as a reed switch, that can be actuated to turn on or turn off a night vision goggle coupled to the dual night vision goggle adapter 60. In such embodiments, the amount of magnetic flux conducted to the magnet sensor 602 (not shown) may be controlled according to the spatial separation, i.e., air gap, between the first magnet 101 and the first magnetic flux conducting unit 104.

In some embodiments, a first secondary shunt 1602 may be positioned adjacent to the first axis 1612 and displaced from the first magnet 101 such that, when the first magnetic flux conducting unit 104 is rotated about the first axis 1612, the first magnetic flux conducting unit 104 overlaps the first secondary shunt 1602. In this configuration, at some angular positions of the magnetic flux conducting unit 104, magnetic flux from the first magnet 101 is shorted through the overlapped first secondary shunt 1602. In some alternative embodiments, a plurality of first secondary shunts may be used.

Also depicted is a first goggle mount 114 that, in some embodiments, may be rotatably coupled to the first magnetic flux conducting unit 104 at a second axis 1614. This coupling may be similar to that described above in regards to the embodiment depicted in FIG. 1. A first flux shunt 1620 may be positioned about the second axis 1614 such that, when the first goggle mount 114 is oriented relative to the first magnetic flux conducting unit 104 such that the first flux shunt 1620 is overlapped by the first magnetic flux conducting unit 104, the magnetic flux being conducted through the first magnetic flux conducting unit 104 is shorted through the first flux shunt 1620. In such an embodiment, the first flux shunt 1620 may facilitate the actuation of a magnetic sensor 602 (not shown) allowing for an attached night vision goggle to turn on in a "use" position, i.e., when the night vision goggle is in place in front of a user's eye, while also turning the attached night vision goggle off when the night vision goggle is rotated away from the "use" position and is stowed for later use.

The first magnet 101 and the other magnetic flux conducting components thus may, in some embodiments, form a first magnetic circuit configured to actuate an attached night vision goggle, that can be toggled on and off using a magnetic sensor 602 (not shown) like a reed switch, according to the positioning of the first magnet 101 relative to the first magnetic flux conducting unit 104 and the first flux shunt 1620 or first secondary shunt 1602 that may be overlapped by the first magnetic flux conducting unit 104.

In some embodiments, the dual night vision goggle adapter 60 may be configured to allow for use of two, separate night vision goggle devices. Such an embodiment may include additional components for a second magnetic circuit that correspond to those described above in regards to the first magnetic circuit. These may include, in some embodiments: a second magnet 121; a second secondary shunt 1603; a second magnetic flux conducting unit 105; a third axis 1616; a second goggle mount 115; a second flux shunt 1622; and, a fourth axis 1618. Operation of the second magnetic circuit may, in some embodiments, be similar or identical to that of the first magnetic circuit. However, as will be appreciated by those skilled in the art, the components of the second magnetic circuit may be varied to provide operating characteristics that differ from those of the first magnetic circuit. Likewise, because those components described previously relating to interpupillary adjustment of the goggle mounts (114 and 115) may be used in conjunction with the dual night vision goggle adapter 60, the positioning and torque required to adjust/rotate a night vision goggle may be set differently for the first goggle mount 114 and the second goggle mount 115. This allows for a user to customize the positioning and adjustability of a night vision goggle used for one eye independently of the positioning and adjustability set for a night vision goggle used for the other eye.

Further depiction of the operation of the dual night vision goggle adapter 60 can be seen in FIGS. 17A-17F.

Figure 17A:
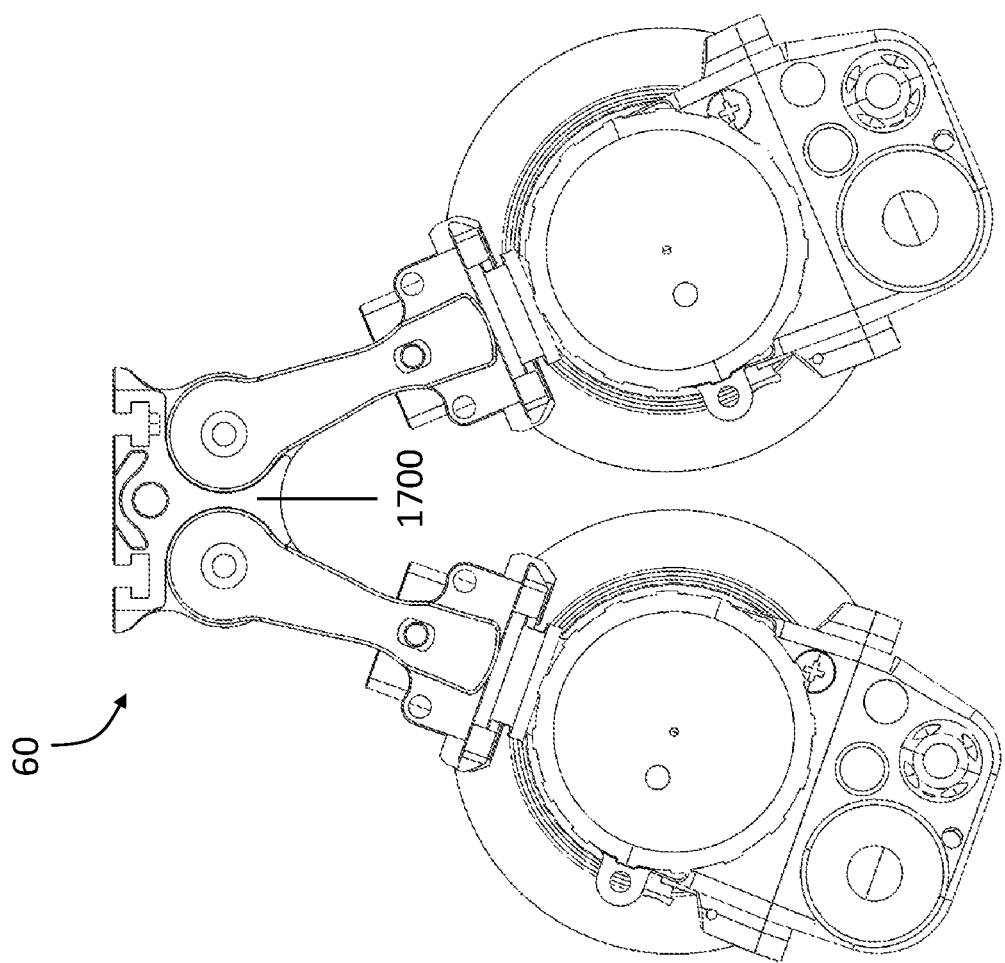
FIG. 17A is a frontal view of a dual night vision goggle adapter in a left eye use/right eye use position according to one embodiment of the present disclosure.

FIG. 17A is a frontal view of a dual night vision goggle adapter 60 in a left eye use/right eye use position according to one embodiment of the present disclosure. A ridge 1700 may, in some embodiments, be included on the dual night vision goggle adapter 60 that creates a mechanical limit to the range of motion allowed for the first magnetic flux conducting unit 104 and the second magnetic flux conducting unit 105. The ridge 1700 may be sized according to the size of one or more night vision goggles to be attached to the dual night vision goggle adapter 60 such that the night vision goggles may not touch while coupled to the dual night vision goggle adapter 60.

Figure 17B:
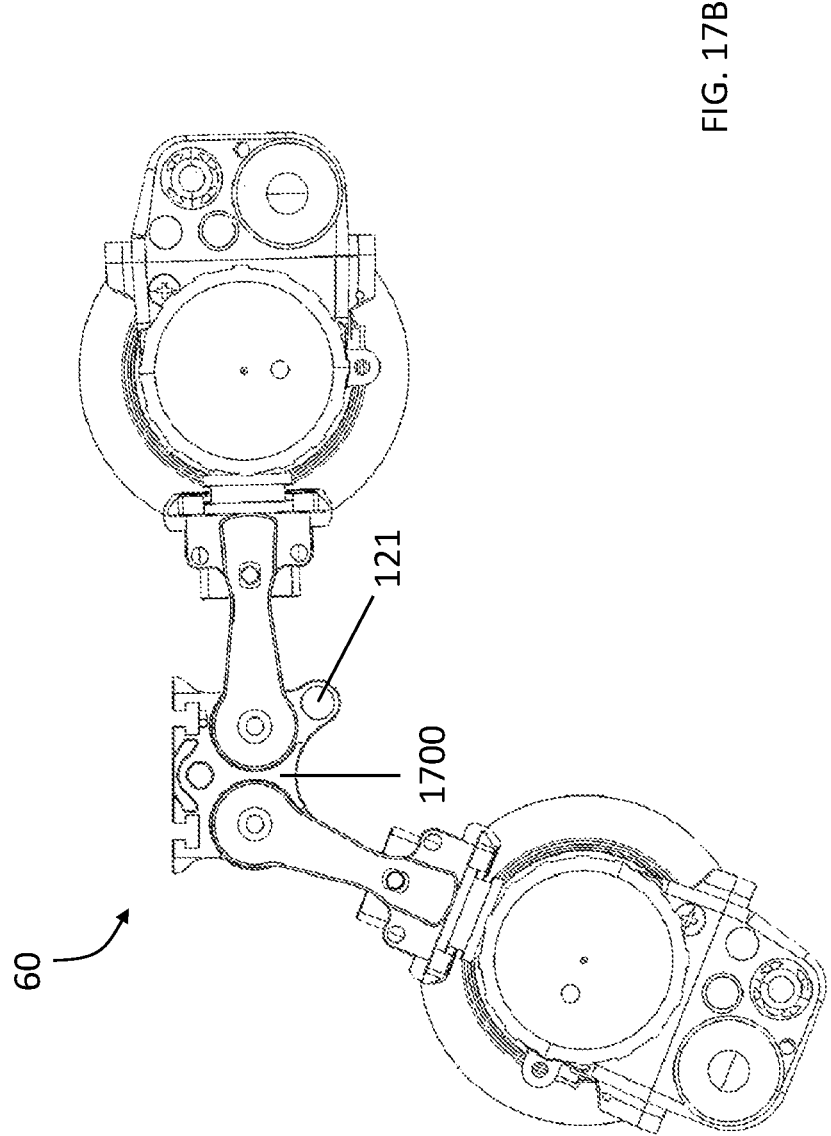
FIG. 17B is a frontal view of a dual night vision goggle adapter in a left eye primary stow/right eye use position according to one embodiment of the present disclosure.

FIG. 17B is a frontal view of a dual night vision goggle adapter 60 in a left eye primary stow/right eye use position according to one embodiment of the present disclosure. Also depicted here is a second magnet 121 that is not overlapped, resulting in the night vision goggle device configured for use in conjunction with the left eye to be powered off.

Figure 17C:
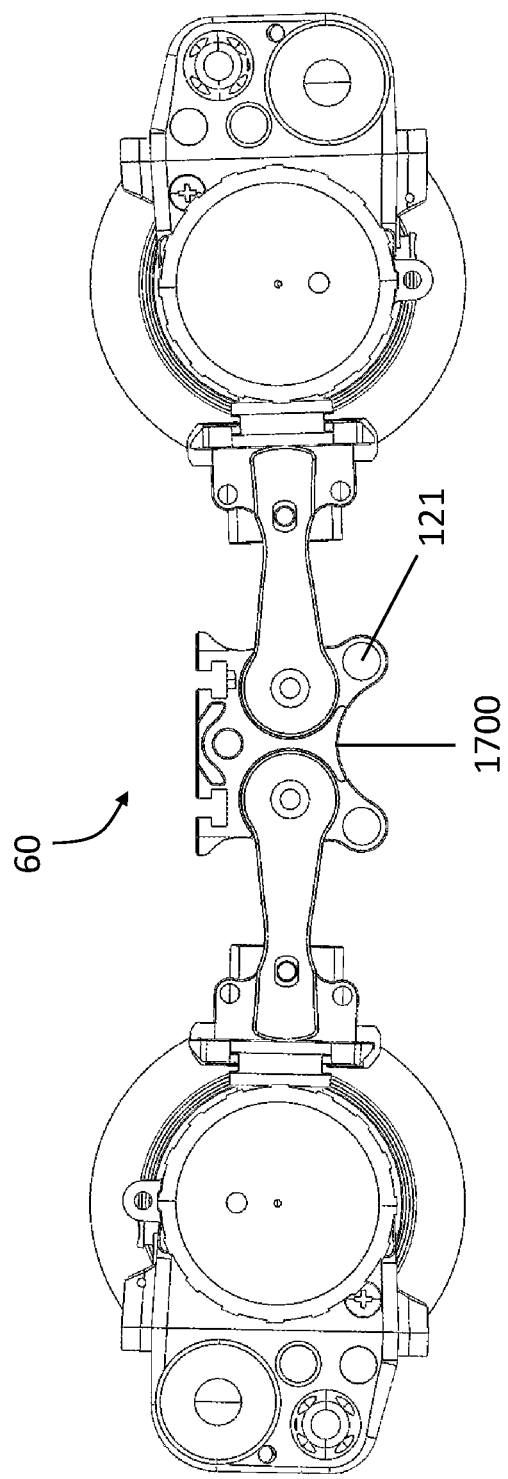
FIG. 17C is a frontal view of a dual night vision goggle adapter in a left eye primary stow/right eye primary stow position according to one embodiment of the present disclosure.

FIG. 17C is a frontal view of a dual night vision goggle adapter 60 in a left eye primary stow/right eye primary stow position according to one embodiment of the present disclosure. Also depicted here is a second magnet 121 that is not overlapped, resulting in the night vision goggle device configured for use in conjunction with the left eye to be powered off. As will be appreciated by one skilled in the art, a similar positioning is shown for the corresponding first magnetic circuit associated with the night vision goggle device configured for use with the right eye.

Figure 17D:
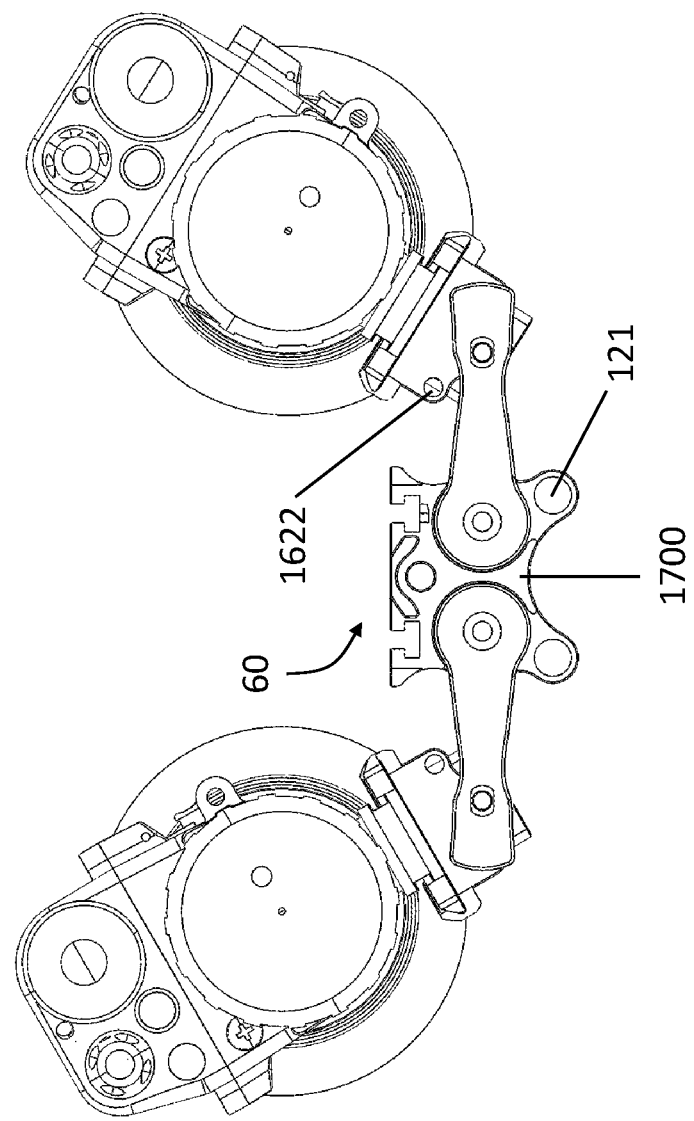
FIG. 17D is a frontal view of a dual night vision goggle adapter in a left eye secondary stow/right eye secondary stow position according to one embodiment of the present disclosure.

FIG. 17D is a frontal view of a dual night vision goggle adapter 60 in a left eye secondary stow/right eye secondary stow position according to one embodiment of the present disclosure. Also depicted here is a second magnet 121 that is not overlapped, resulting in the night vision goggle device configured for use in conjunction with the left eye to be powered off. Likewise, a second flux shunt 1622 is overlapped, which may, in some embodiments, also reduce the amount of magnetic flux reaching the magnet sensor (not shown) and cause an associated night vision goggle device to be powered off in this position. As will be appreciated by one skilled in the art, a similar positioning is shown for the corresponding first magnetic circuit associated with the night vision goggle device configured for use with the right eye.

Figure 17E:
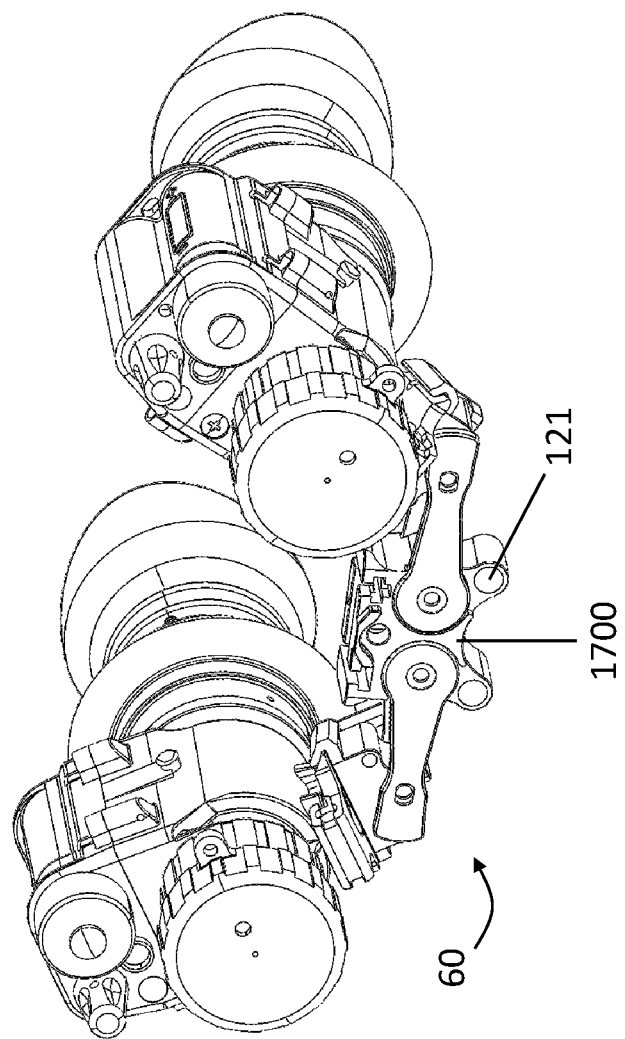
FIG. 17E is a prospective view of a dual night vision goggle adapter in a left eye secondary stow/right eye secondary stow position according to one embodiment of the present disclosure.

FIG. 17E is a perspective view of a dual night vision goggle adapter 60 in a left eye secondary stow/right eye secondary stow position according to one embodiment of the present disclosure. Also depicted here is a second magnet 121 that is not overlapped, resulting in the night vision goggle device configured for use in conjunction with the left eye to be powered off. Likewise, a second flux shunt (not shown) is overlapped, which may, in some embodiments, also reduce the amount of magnetic flux reaching the magnet sensor (not shown) and cause an associated night vision goggle device to be powered off in this position. As will be appreciated by one skilled in the art, a similar positioning is shown for the corresponding first magnetic circuit associated with the night vision goggle device configured for use with the right eye.

Figure 17F:
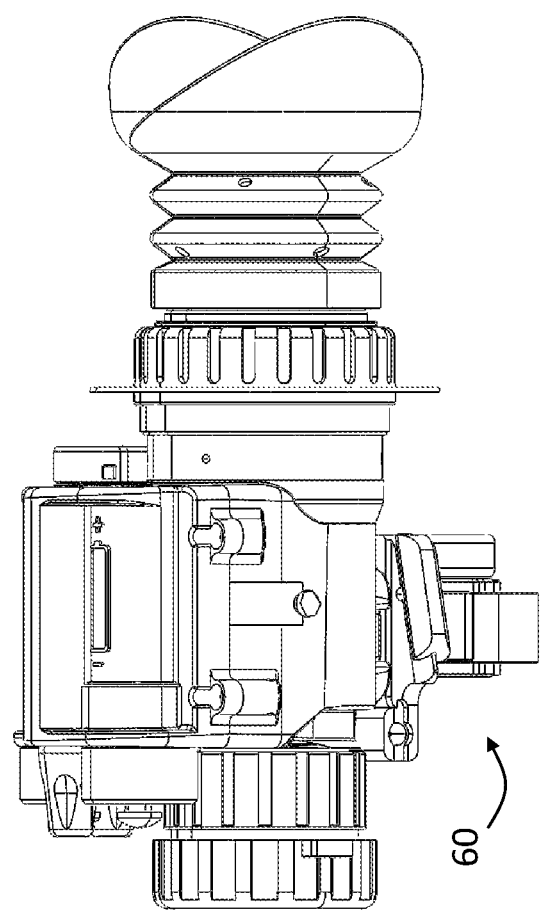
FIG. 17F is a lateral view of a dual night vision goggle adapter in a left eye secondary stow/right eye secondary stow position according to one embodiment of the present disclosure.

FIG. 17F is a perspective view of a dual night vision goggle adapter 60 in a left eye secondary stow/right eye secondary stow position according to one embodiment of the present disclosure.

Further understanding of the operation of the dual night vision goggle adapter 60 in use with the flux switching helmet mount assembly 90 can be gained from FIGS. 18A-22B described in detail below.

Figure 18A:
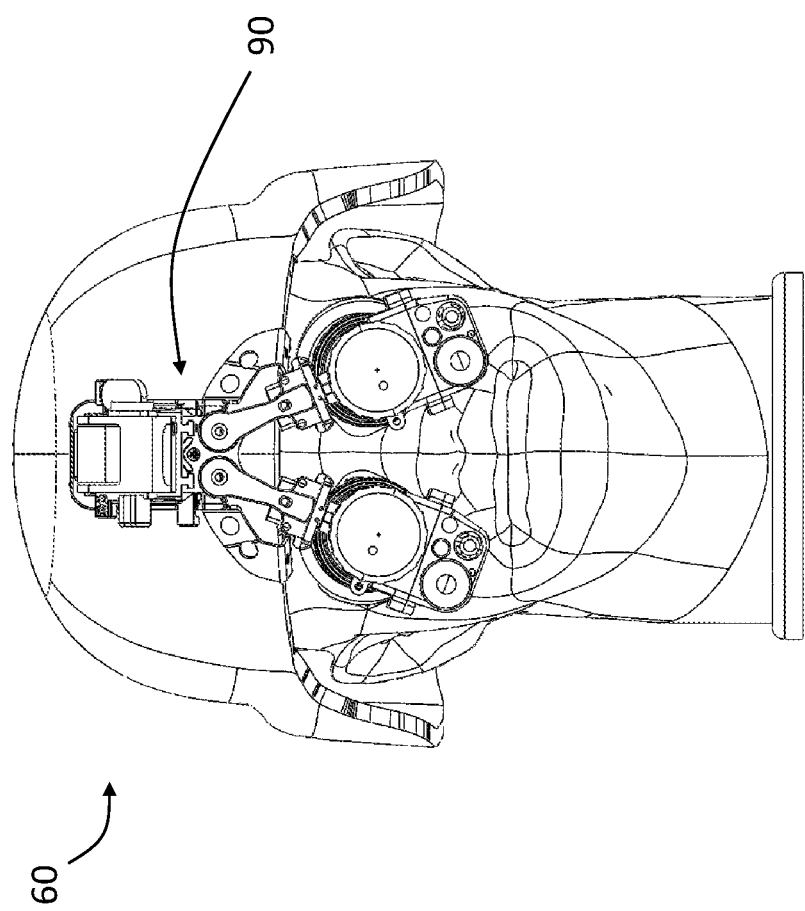
FIG. 18A is a frontal view of a flux switching helmet mount assembly coupled to a dual night vision goggle adapter, as worn by a user, in a right eye use/left eye use position according to one embodiment of the present disclosure.

FIG. 18A is a frontal view of a flux switching helmet mount assembly 90 coupled to a dual night vision goggle adapter 60, as worn by a user, in a right eye use/left eye use position according to one embodiment of the present disclosure. In such a configuration, the booster magnet (not shown) causes an increased amount of flux to be directed to the magnet sensor (not shown) causing the associated night vision goggle devices to be in the "on" or active state.

Figure 18B:
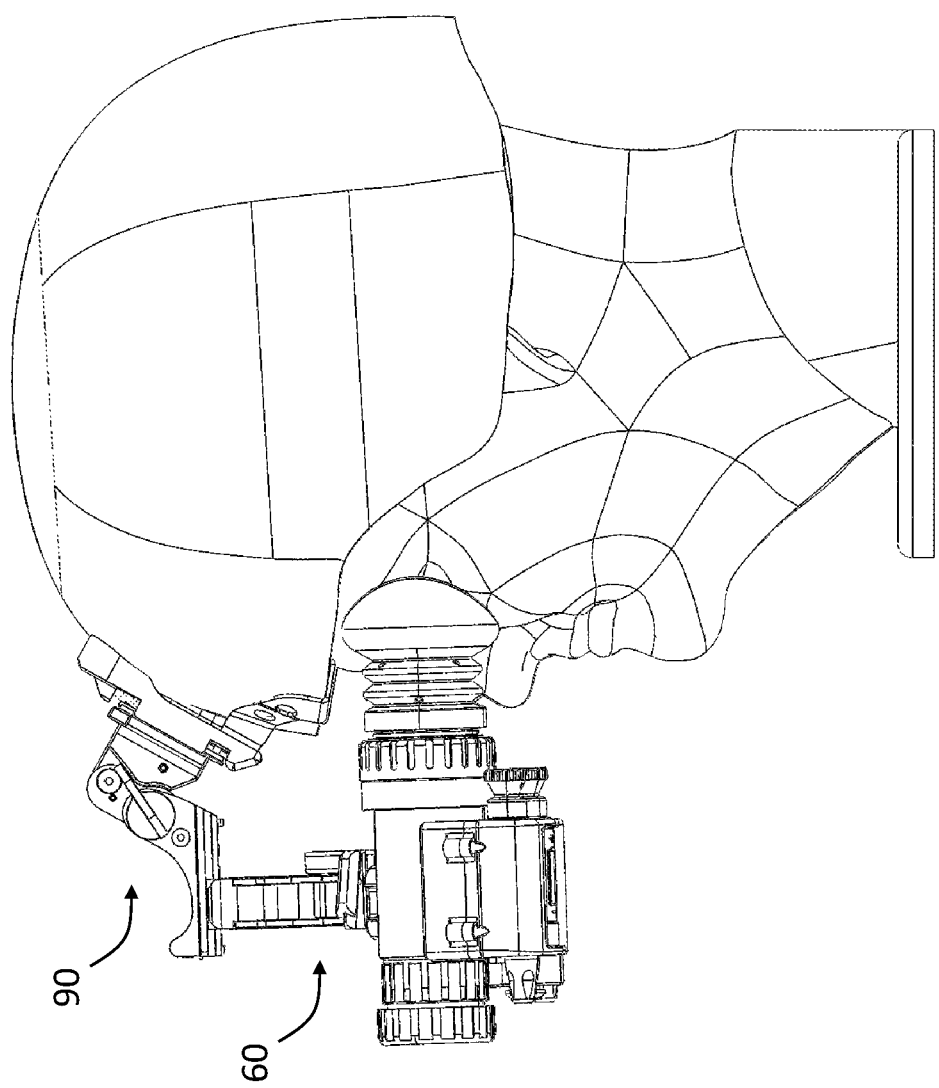
FIG. 18B is a lateral view of a flux switching helmet mount assembly coupled to a dual night vision goggle adapter, as worn by a user, in a right eye use/left eye use position according to one embodiment of the present disclosure.

FIG. 18B is a lateral view of a flux switching helmet mount assembly 90 coupled to a dual night vision goggle adapter 60, as worn by a user, in a right eye use/left eye use position according to one embodiment of the present disclosure. In such a configuration, the booster magnet (not shown) causes an increased amount of flux to be directed to the magnet sensor (not shown) causing the associated night vision goggle devices to be in the "on" or active state.

Figure 19A:
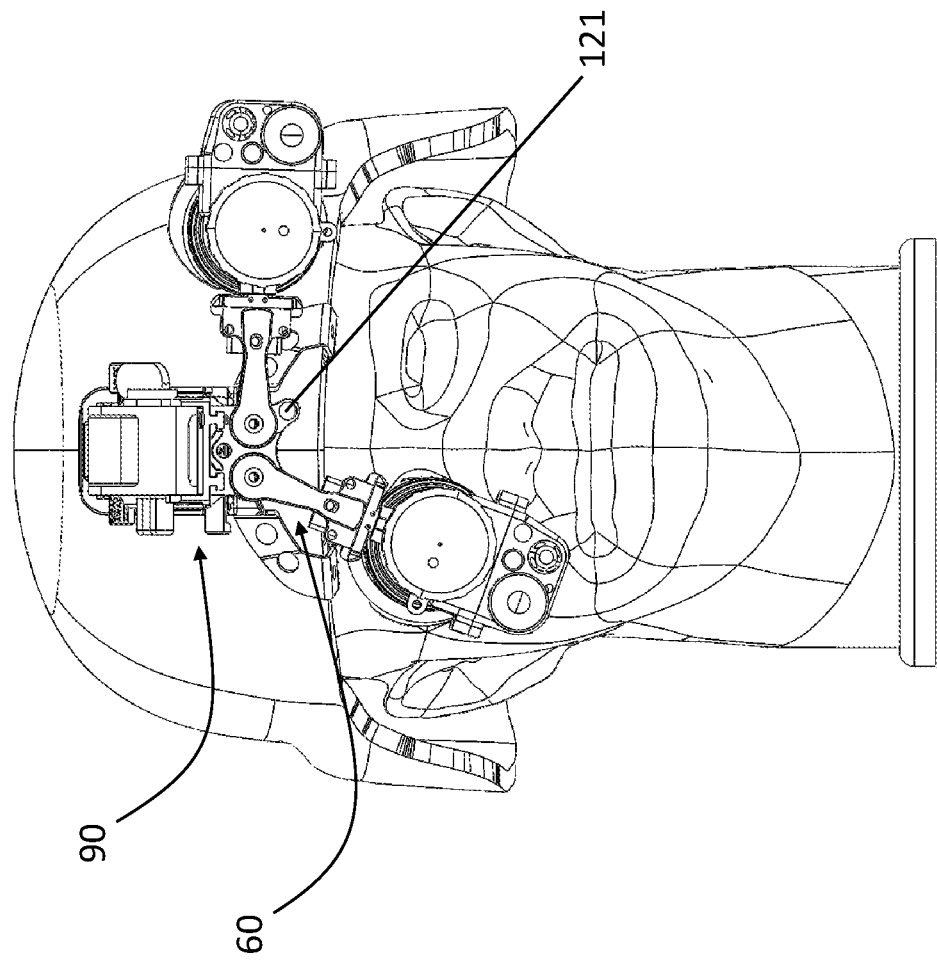
FIG. 19A is a frontal view of a flux switching helmet mount assembly coupled to a dual night vision goggle adapter, as worn by a user, in a right eye use/left eye secondary stow position according to one embodiment of the present disclosure.

FIG. 19A is a frontal view of a flux switching helmet mount assembly 90 coupled to a dual night vision goggle adapter 60, as worn by a user, in a right eye use/left eye secondary stow position according to one embodiment of the present disclosure. In such a configuration, the booster magnet (not shown) causes an increased amount of flux to be directed to the magnet sensor (not shown) causing the night vision goggle device associated with the right eye to be in the "on" or active state, while the displacement of the second magnet 121 away from the second magnetic circuit causes the night vision goggle associated with the left eye to be powered off. As will be appreciated by one skilled in the art, the use of a secondary shunt may be omitted in embodiments, such as the one depicted herein, because a sufficient reduction of the magnetic flux being conducted to the magnet sensor (not shown) can be achieved through displacement of the first magnet (not shown) or the second magnet 121 from the magnetic circuits which creates an air gap sufficient to reduce the magnetic flux conducted below the level required by the magnet sensor (not shown) for actuation. Thus, the use of a secondary shunt, in some embodiments, may be omitted based on the configuration of the other magnetic flux producing and magnetic flux conducting components.

Figure 19B:
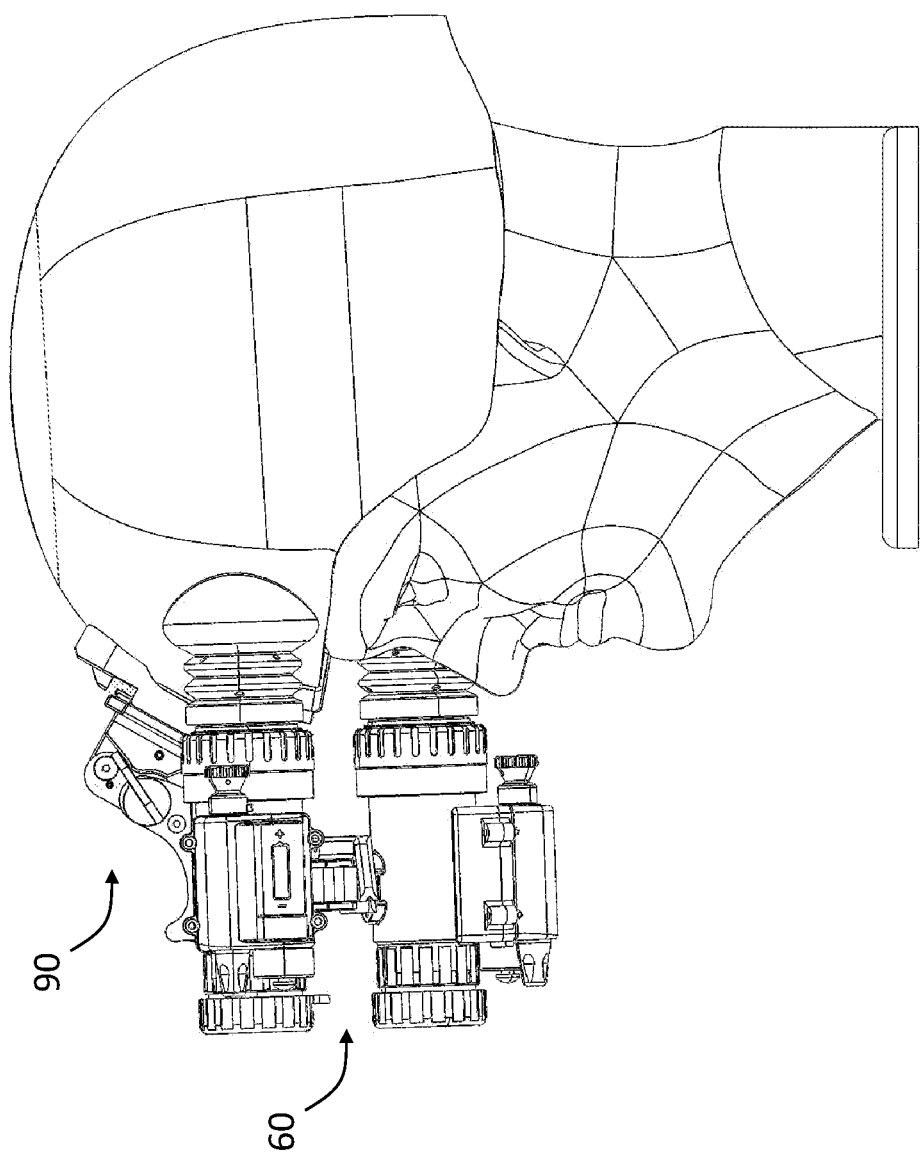
FIG. 19B is a lateral view of a flux switching helmet mount assembly coupled to a dual night vision goggle adapter, as worn by a user, in a right eye use/left eye secondary stow position according to one embodiment of the present disclosure.

FIG. 19B is a lateral view of a flux switching helmet mount assembly 90 coupled to a dual night vision goggle adapter 60, as worn by a user, in a right eye use/left eye secondary stow position according to one embodiment of the present disclosure. In such a configuration, the booster magnet (not shown) causes an increased amount of flux to be directed to the magnet sensor (not shown) causing the night vision goggle device associated with the right eye to be in the "on" or active state, while the displacement of the second magnet 121 away from the second magnetic circuit causes the night vision goggle associated with the left eye to be powered off.

Figure 20A:
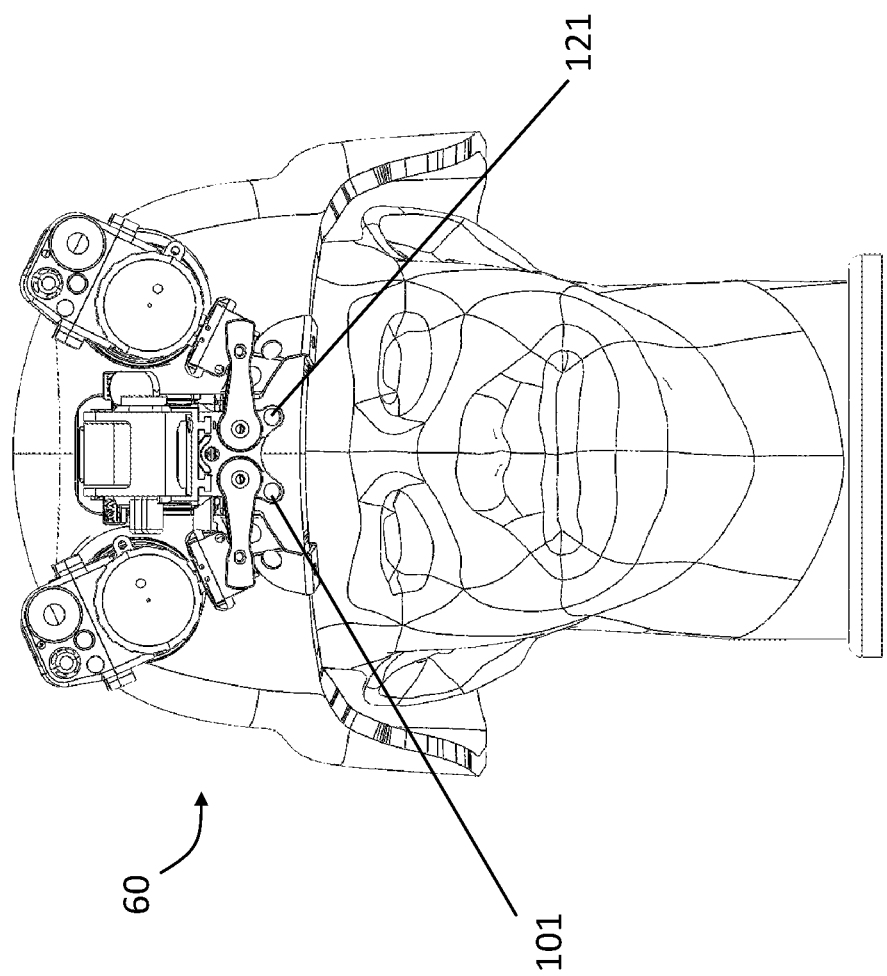
FIG. 20A is a frontal view of a flux switching helmet mount assembly coupled to a dual night vision goggle adapter, as worn by a user, in a right eye tertiary stow/left eye tertiary stow position according to one embodiment of the present disclosure.

FIG. 20A is a frontal view of a flux switching helmet mount assembly 90 coupled to a dual night vision goggle adapter 60, as worn by a user, in a right eye tertiary stow/left eye tertiary stow position according to one embodiment of the present disclosure. In such a configuration, the booster magnet (not shown) causes an increased amount of flux to be directed to the magnet sensor (not shown) of the associated night vision goggle devices, however the displacement of the second magnet 121 away from the second magnetic circuit and the first magnet 101 from the first magnetic circuit causes the night vision goggles to be powered off.

Figure 20B:
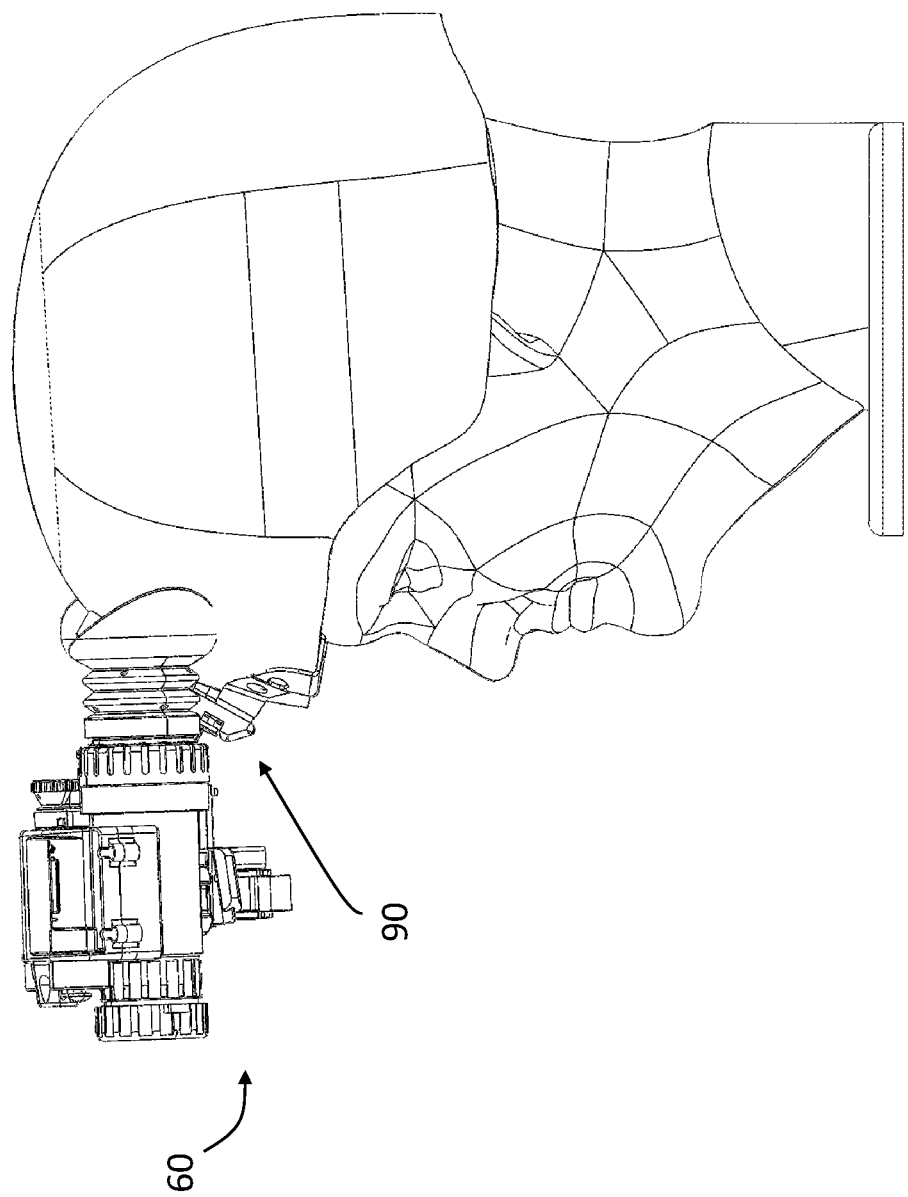
FIG. 20B is a lateral view of a flux switching helmet mount assembly coupled to a dual night vision goggle adapter, as worn by a user, in a right eye tertiary stow/left eye tertiary stow position according to one embodiment of the present disclosure.

FIG. 20B is a lateral view of a flux switching helmet mount assembly 90 coupled to a dual night vision goggle adapter 60, as worn by a user, in a right eye tertiary stow/left eye tertiary stow position according to one embodiment of the present disclosure. In such a configuration, the booster magnet (not shown) causes an increased amount of flux to be directed to the magnet sensor (not shown) of the associated night vision goggle devices, however the displacement of the second magnet 121 away from the second magnetic circuit and the first magnet 101 from the first magnetic circuit causes the night vision goggles to be powered off.

Figure 21A:
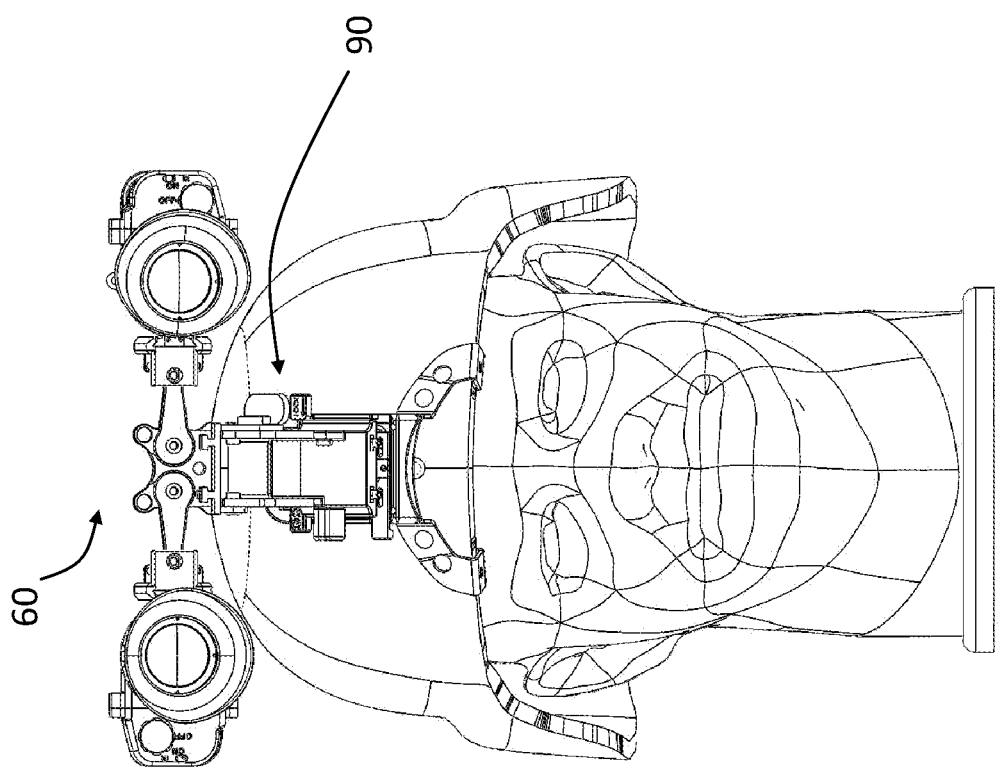
FIG. 21A is a frontal view of a flux switching helmet mount assembly coupled to a dual night vision goggle adapter, as worn by a user, in a flipped right eye secondary stow/left eye secondary stow position according to one embodiment of the present disclosure.

FIG. 21A is a frontal view of a flux switching helmet mount assembly 90 coupled to a dual night vision goggle adapter 60, as worn by a user, in a flipped right eye secondary stow/left eye secondary stow position according to one embodiment of the present disclosure. In such a configuration, the suppressor magnet (not shown) causes an decreased amount of flux to be directed to the magnet sensor (not shown) of the associated night vision goggle devices as the suppressor magnet pulls magnetic flux from the first magnet 101 and second magnet 121 towards itself and out of the magnetic circuits, and the displacement of the second magnet 121 away from the second magnetic circuit and the first magnet 101 from the first magnetic circuit causes the night vision goggles to be powered off.

Figure 21B:
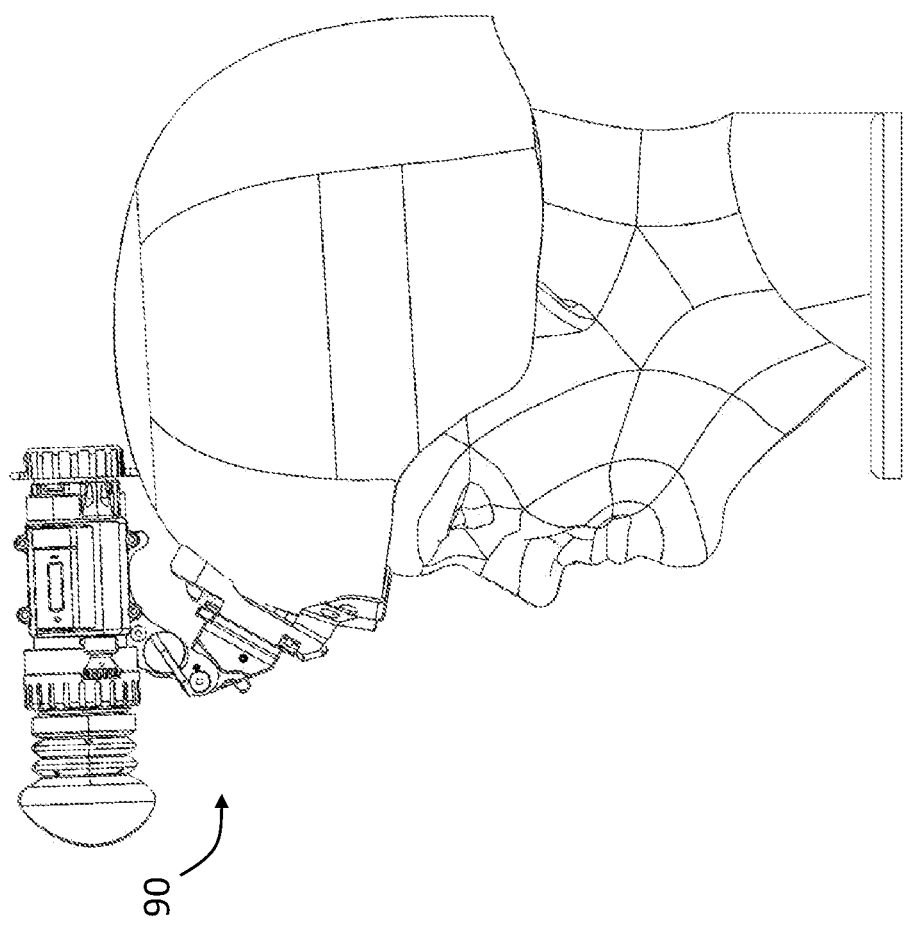
FIG. 21B is a lateral view of a flux switching helmet mount assembly coupled to a dual night vision goggle adapter, as worn by a user, in a flipped right eye secondary stow/left eye secondary stow position according to one embodiment of the present disclosure.

FIG. 21B is a lateral view of a flux switching helmet mount assembly 90 coupled to a dual night vision goggle adapter 60, as worn by a user, in a flipped right eye secondary stow/left eye secondary stow position according to one embodiment of the present disclosure. In such a configuration, the suppressor magnet (not shown) causes an decreased amount of flux to be directed to the magnet sensor (not shown) of the associated night vision goggle devices as the suppressor magnet pulls magnetic flux from the first magnet 101 and second magnet 121 towards itself and out of the magnetic circuits, and the displacement of the second magnet 121 away from the second magnetic circuit and the first magnet 101 from the first magnetic circuit causes the night vision goggles to be powered off.

Figure 22A:
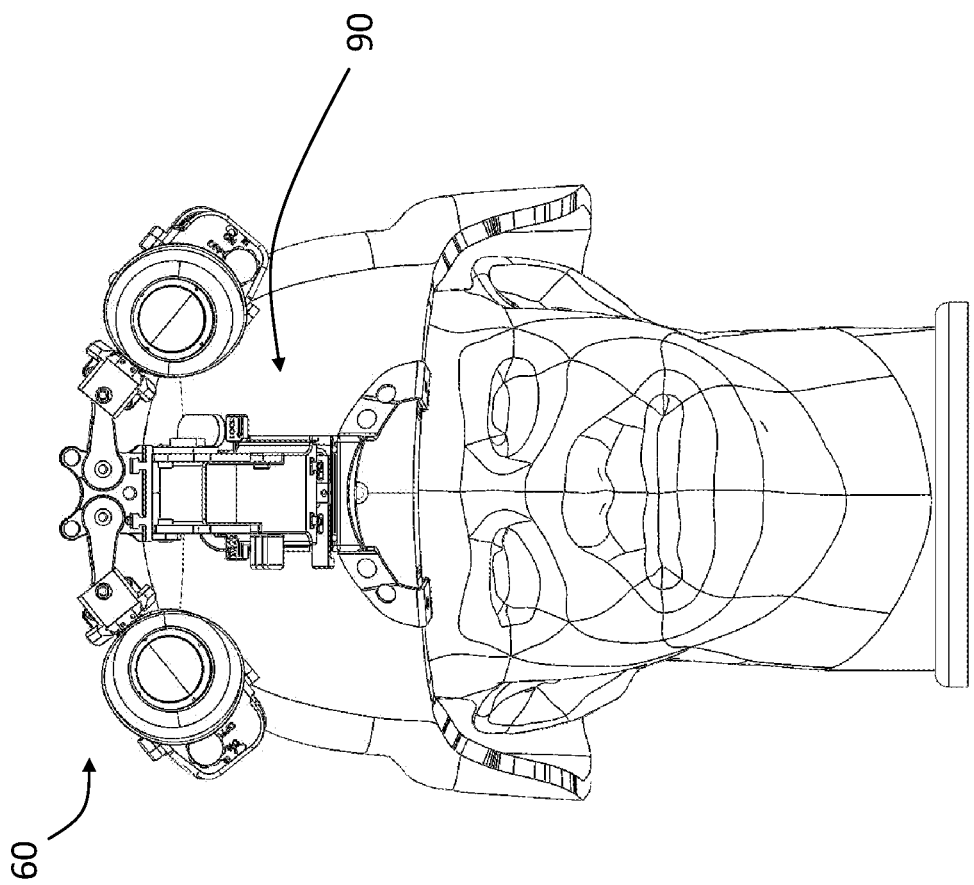
FIG. 22A is a frontal view of a flux switching helmet mount assembly coupled to a dual night vision goggle adapter, as worn by a user, in a flipped right eye tertiary stow/left eye tertiary stow position according to one embodiment of the present disclosure.

FIG. 22A is a frontal view of a flux switching helmet mount assembly 90 coupled to a dual night vision goggle adapter 60, as worn by a user, in a flipped right eye tertiary stow/left eye tertiary stow position according to one embodiment of the present disclosure. In such a configuration, the suppressor magnet (not shown) causes an decreased amount of flux to be directed to the magnet sensor (not shown) of the associated night vision goggle devices as the suppressor magnet pulls magnetic flux from the first magnet 101 and second magnet 121 towards itself and out of the magnetic circuits, likewise the displacement of the second magnet 121 away from the second magnetic circuit in addition to the overlapping of a second shunt 1622 and the displacement of the first magnet 101 from the first magnetic circuit in addition to the overlapping of a first shunt 1620 causes the night vision goggles to be powered off.

Figure 22B:
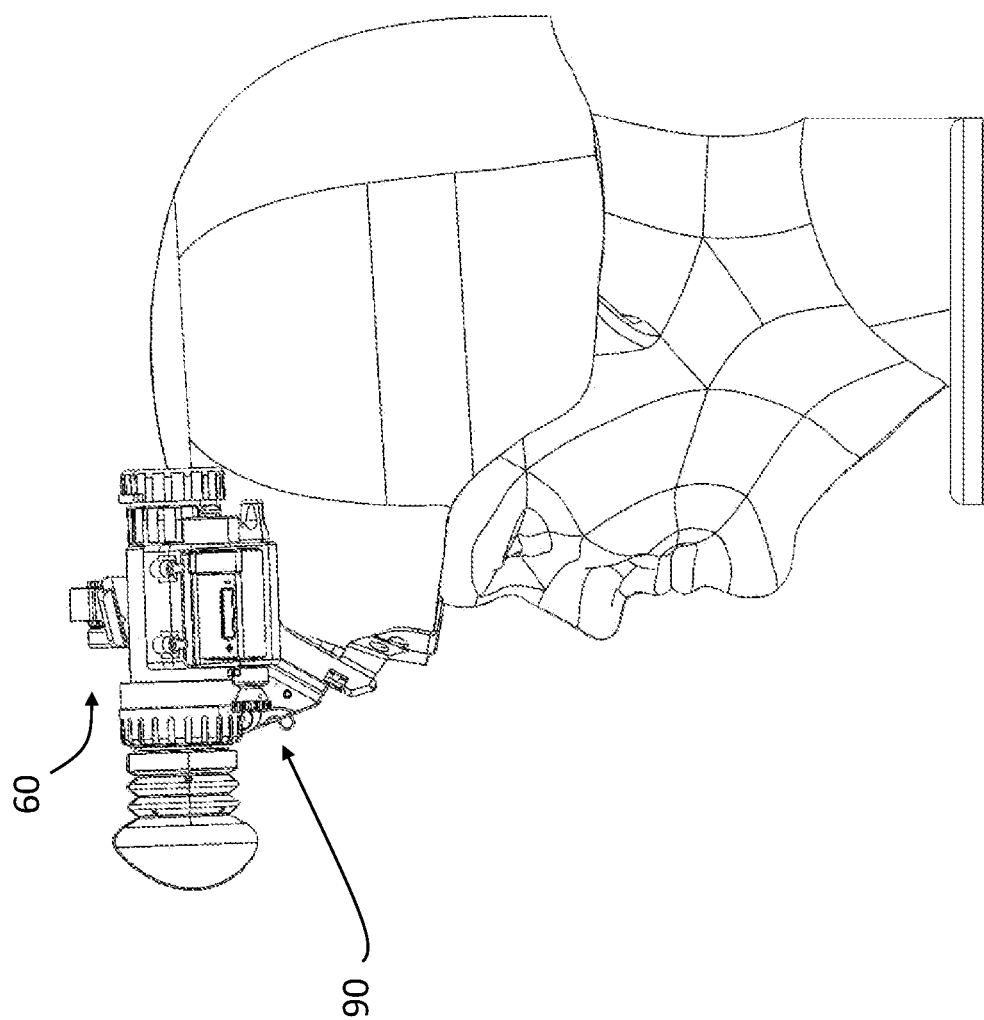
FIG. 22B is a lateral view of a flux switching helmet mount assembly coupled to a dual night vision goggle adapter, as worn by a user, in a flipped right eye tertiary stow/left eye tertiary stow position according to one embodiment of the present disclosure.

FIG. 22B is a lateral view of a flux switching helmet mount assembly 90 coupled to a dual night vision goggle adapter 60, as worn by a user, in a flipped right eye tertiary stow/left eye tertiary stow position according to one embodiment of the present disclosure. In such a configuration, the suppressor magnet (not shown) causes an decreased amount of flux to be directed to the magnet sensor (not shown) of the associated night vision goggle devices as the suppressor magnet pulls magnetic flux from the first magnet 101 and second magnet 121 towards itself and out of the magnetic circuits, likewise the displacement of the second magnet 121 away from the second magnetic circuit in addition to the overlapping of a second shunt 1622 and the displacement of the first magnet 101 from the first magnetic circuit in addition to the overlapping of a first shunt 1620 causes the night vision goggles to be powered off.

As will be appreciated by one skilled in the art, the dual night vision goggle adapter 60 may be coupled to the flux switching helmet mount assembly 90 in a similar or identical manner as was described previously for the night vision goggle adapter 10. As such, additional switching modes, corresponding to the "on" and "off" positions of the flux switching helmet mount assembly 90 may be, in some embodiments, possible when the dual night vision goggle adapter 60 is coupled to the flux switching helmet mount assembly 90.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims and their equivalents.

What is claimed is:

1. A flux switching helmet mount assembly, comprising:
    a mounting base comprising:
        a central axis;
        a booster magnet positioned about the central axis and having a first polar orientation; and
        a suppressor magnet positioned about the central axis and displaced from the booster magnet and having a second polar orientation;
    a magnetic flux conducting rail assembly; and
    a mounting point coupled to the mounting base;
    wherein the magnetic flux conducting rail assembly is configured to be rotatably coupled to the central axis and is further configured to overlap the booster magnet in a first position and conduct a magnetic flux according to the first polar orientation along the magnetic flux conducting rail assembly; and
    wherein the magnetic flux conducting rail assembly is configured to overlap the suppressor magnet in a second position and conduct a magnetic flux according to the second polar orientation along the magnetic flux conducting rail assembly.

2. The flux switching helmet mount assembly of claim 1, further comprising:
    a slidable flux conducting unit configured to couple to the magnetic flux conducting rail assembly and slide along a portion of the magnetic flux conducting rail assembly.

3. The flux switching helmet mount assembly of claim 2 further comprising:
    a goggle mount assembly configured to couple to the slidable flux conducting unit;
    a primary magnet generating a first magnetic flux;
    a magnetic flux conducting unit having a first end and a second end, wherein the first end is rotatable about a first axis positioned adjacent to the primary magnet and the second end is coupled to a second axis located within the goggle mount assembly about which the goggle mount assembly can rotate;
    a first plurality of shunts disposed about the primary magnet; and a second plurality of shunts disposed about the goggle mount assembly;

wherein the magnetic flux conducting unit is configured to overlap the primary magnet and form a magnetic circuit for conducting the first magnetic flux towards the second end of the magnetic flux conducting unit when none of the first plurality of shunts and none of the second plurality of shunts are overlapped by the magnetic flux conducting unit; and wherein the first magnetic flux is shorted through one of the first plurality of shunts or the second plurality of shunts when the magnetic flux conducting unit is positioned such that one of the first plurality of shunts or one of the second plurality of shunts is overlapped by the magnetic flux conducting unit.

4. The flux switching helmet mount assembly of claim 3, wherein the magnetic flux conducting unit comprises a pair of magnetic flux conducting units, each having a top portion and a bottom portion, configured to be rotatably coupled to the first axis at the top portion of each of the pair of magnetic flux conducting units and coupled to the second axis at the bottom portion of each of the pair of magnetic flux conducting units.

5. The flux switching helmet mount assembly of claim 4, further comprising an adapter mount assembly, wherein the first axis is located within the adapter mount assembly.

6. The flux switching helmet mount assembly of claim 5, wherein the first plurality of shunts are displaced within the adapter mount assembly about the first axis.

7. The flux switching helmet mount assembly of claim 6, further comprising:

an array of detents on the adapter mount assembly and located about the first axis; and a plurality of spring-loaded balls;

wherein the spring-loaded balls are configured to be compressed between the magnetic flux conducting unit and the adapter mount assembly; and wherein the spring-loaded balls are configured to fit partially within the detents causing the magnetic flux conducting unit to be retained at an angular position relative to the adapter mount assembly until a rotational force is applied to the magnetic flux conducting unit sufficient to overcome the force retaining at least one of the plurality of spring loaded balls within one of the array of detents.

8. The flux switching helmet mount assembly of claim 7, wherein the location of the array of detents corresponds to at least one position wherein the magnetic flux conducting unit does not overlap one of the first plurality of shunts; and wherein the location of the array of detents also corresponds to at least one position wherein the magnetic flux conducting unit does overlap at least one of the first plurality of shunts.

9. The flux switching helmet mount assembly of claim 1, wherein the base further comprises:

a first lobe configured to house the booster magnet; and a second lobe configured to house the suppressor magnet.

10. The flux switching helmet mount assembly of claim 1, wherein the base further comprises:

a locking mechanism configured to selectively retain the magnetic flux conducting rail assembly in the first position or the second position.

11. The flux switching helmet mount assembly of claim 1, wherein the magnetic flux conducting rail assembly comprises at least two magnetic flux conducting rails.

\* \* \* \* \*